(12) United States Patent
Rygh et al.

(10) Patent No.: US 8,116,332 B2
(45) Date of Patent: Feb. 14, 2012

(54) SWITCH ARBITRATION

(75) Inventors: Hans Olaf Rygh, Oslo (NO); Knut Tvete, Lovenstad (NO); Ali Bozkaya, Oslo (NO)

(73) Assignee: Oracle America, Inc., Redwood Shores, CA (US)

( * ) Notice: Subject to any disclaimer, the term of this patent is extended or adjusted under 35 U.S.C. 154(b) by 936 days.

(21) Appl. No.: 12/124,706

(22) Filed: May 21, 2008

(65) Prior Publication Data

US 2008/0317024 A1 Dec. 25, 2008

Related U.S. Application Data

(60) Provisional application No. 60/945,778, filed on Jun. 22, 2007.

(51) Int. Cl.
*H04L 12/28* (2006.01)
*H04L 12/56* (2006.01)
*H04L 12/413* (2006.01)
*H04L 12/43* (2006.01)
*H04J 3/02* (2006.01)

(52) U.S. Cl. .......... 370/413; 370/447; 370/462
(58) Field of Classification Search .............. None
See application file for complete search history.

(56) References Cited

U.S. PATENT DOCUMENTS

| 7,203,202 | B2 * | 4/2007 | Chao et al. ............... 370/414 |
| 7,672,303 | B1 * | 3/2010 | Baxter et al. ............. 370/389 |
| 2003/0072326 | A1 * | 4/2003 | Alasti et al. ............. 370/462 |
| 2003/0202531 | A1 * | 10/2003 | Dooley et al. ............ 370/462 |
| 2008/0159145 | A1 * | 7/2008 | Muthukrishnan et al. ... 370/235 |

* cited by examiner

*Primary Examiner* — Chirag Shah
*Assistant Examiner* — Ashley Shivers
(74) *Attorney, Agent, or Firm* — Park, Vaughan, Fleming & Dowler LLP

(57) ABSTRACT

A method of providing switch arbitration for the passing of packets between transmitters and receivers in a switch having a plurality of transmitters and receivers, comprises globally distributing information about buffer contents and packet requests between transmitters and receivers.

14 Claims, 39 Drawing Sheets

FIG. 1

Example of poor resource utilization

Example of optimal utilization of the resources

Req signals in alternative 2

SWITCH ARBITRATION

This application hereby claims priority under 35 U.S.C. §119 to U.S. Provisional Patent Application No. 60/945,778, filed on 22 Jun. 2007, entitled "COMMUNICATION SYSTEMS". The present application hereby incorporates by reference the above-referenced provisional patent application.

BACKGROUND

The invention relates to switch arbitration, for example for use in high performance switches.

The efficiency of a high performance switch for computer buses, for example for PCI Express or InfiniBand, is dependent on the chosen arbitration scheme that orders the internal packet transfers from the input ports (transmitters) to the output ports (receivers).

A switch has a number of resources, such as ports, buffers and internal busses. These resources will often depend on each other (e.g., the usage of some resources typically requires the availability of others). At a certain time, a buffer at each input port typically holds packets to several destinations, while packets to a certain destination are held in different input buffers. If an input buffer has a single read port, and this read port is busy feeding data to one output port, another output port might have to wait idle until the read port of the input buffer becomes available.

Having an arbitration scheme that orders the packet transfers in a way so that most of the resources of the switch are in use, will make it possible to transfer the highest number of packets at the same time. This will result in a highly efficient switch. On the other hand a scheme where a great number of the resources are unused for longer periods of time, give low switch efficiency.

The present invention seeks to provide efficient arbitration for a switch system.

SUMMARY

An aspect of the invention can provide a method of providing switch arbitration for the passing of packets between transmitters and receivers in a switch having a plurality of transmitters and receivers. The method comprises globally distributing information about buffer contents and packet requests between transmitters and receivers.

An example embodiment of the invention can provide efficient switch arbitration.

In an example embodiment, buffer contents information can be distributed through a set of first signals from a transmitter to all receivers, the first signals informing all receivers about the packets a transmitter holds to respective receivers. Packet request information can be distributed through a set of second signals sent from a receiver requesting a packet transfer to all transmitters, the second signals informing the transmitters that a packet transfer is requested from this receiver, and from which transmitter the receiver is requesting a packet.

An example embodiment of the invention can provide a switch having a plurality of transmitters and receivers. The transmitters and receivers can provide switch arbitration for the passing of packets between the transmitters and receivers, wherein a transmitter having buffer contents to transmit can distribute information about the buffer contents globally to all receivers and a receiver requesting a packet transfer can distribute packet request information globally to all transmitters.

A computer readable medium can be provided with program code operable to control transmitters and receivers of a switch to operate in such a manner.

Although various aspects of the invention are set out in the accompanying independent and dependent claims, other aspects of the invention include any combination of features from the described embodiments and/or the accompanying dependent claims, possibly with the features of the independent claims, and not solely the combinations explicitly set out in the accompanying claims.

BRIEF DESCRIPTION OF THE DRAWINGS

Specific embodiments are described by way of example only with reference to the accompanying Figures in which:

FIG. 1 is a schematic representation of the rear of an example switch chassis;

Figure 2:
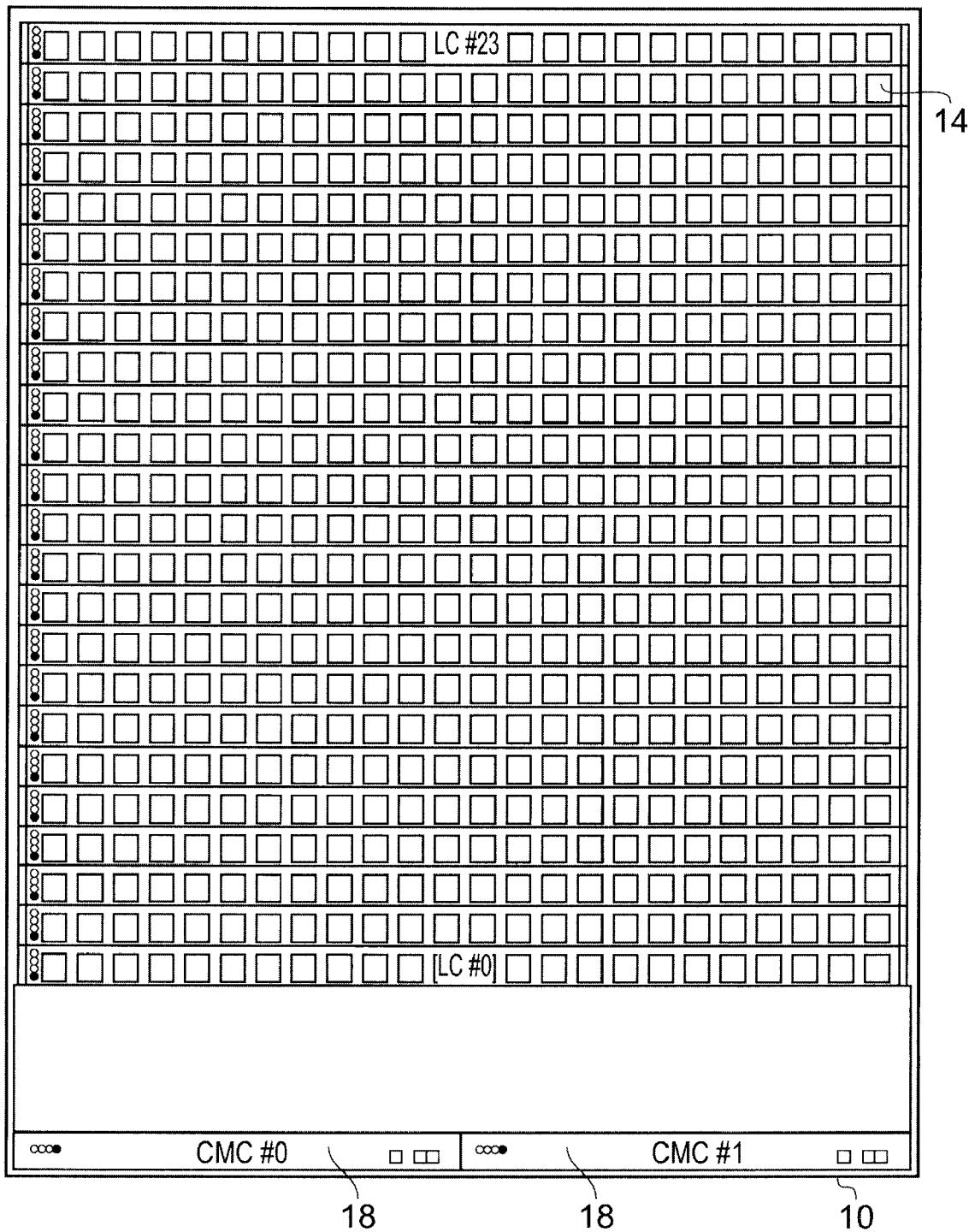
FIG. 2 is a schematic representation of the front of the example switch chassis.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention.

DETAILED DESCRIPTION

An example embodiment of a 3456-port InfiniBand 4×DDR switch in a custom rack chassis is described, with the switch architecture being based upon a 5-stage CLOS fabric. The rack chassis can form a switch enclosure.

The CLOS network, first described by Charles Clos in 1954, is a multi-stage fabric built from smaller individual switch elements that provides full-bisectional bandwidth for all end points, assuming effective dispersive routing.

Given that an external connection (copper or fiber) costs several times more per port than the silicon cost, the key to make large CLOS networks practical is to minimize the number of external cables required and to maximize the number of internal interconnections. This reduces the cost and increases the reliability. For example, a 5-stage fabric constructed with switching elements of size (n) ports supports (n*n/2*n/2) edge points, using (5*n/2*n/2) switch elements with a total of (3*n*n/2*n/2) connections. The ratio of total to external connections is 5:1, i.e. 80% of all connections can be kept internal. The switch elements (switch chips) in the described example can be implemented using a device with 24 4×DDR ports.

An example switch uses a connector that support 3 4× ports per connector, which can further to minimize a number of cables needed. This can provides a further 3:1 reduction in the number of cables. In a described example, only 1152 cables (1/3*n*n/2*n/2) are required.

In contrast if prior commercially available 288-port switches and 24-port switches were used to create a 3456-port fabric a total of 6912 cables (2*n*n/2*n/2) would be required.

The example switch can provide a single chassis that can implement a 5-stage CLOS fabric with 3456 4×DDR ports. High density external interfaces can be provided, including fiber, shielded copper, fiber and twisted pair copper. The amount of cabling can be reduced by 84.4% when compared to building a 3456-port fabric with commercially available 24-port and 288-port switches. In the example embodiment, an orthogonal midplane design can be provided that is capable of DDR data rates.

An example switch can address a full range of HPC cluster computing from a few hundred to many thousand of nodes with a reliable and cost-effective solution that uses fewer chassis and cables than prior solutions.

Figure 1:
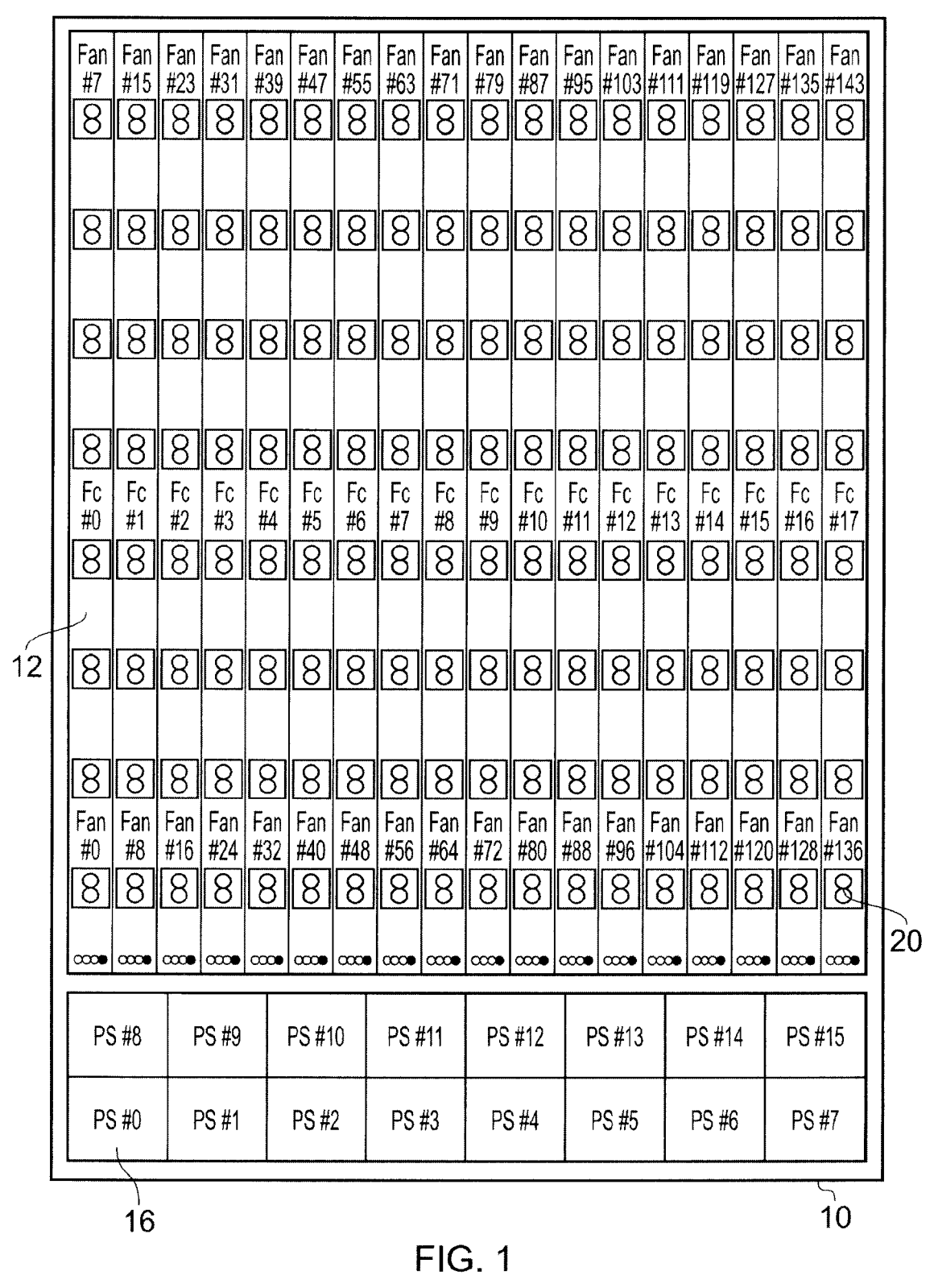

FIGS. 1 and 2 are schematic diagrams of an example of a switch chassis as viewed from the rear (FIG. 1) and front (FIG. 2), respectively. This example comprises a custom rack chassis 10 that is 60" high, 47" wide, and 36" deep, not including a cable management system. The example embodiment provides a passive orthogonal midplane design (not shown in FIGS. 1 and 2) that provides a direct interface between Line Cards (LC) 12 and Fabric Cards (FC) 14. The line cards provide connections to external lines and the fabric card form switch fabric cards for providing switching functions.

In the present example, up to 18 fabric cards (FC0 to FC17) 12, FIG. 1 are provided. Each fabric card 12 plugs vertically into the midplane from the rear.

In the present example, up to 24 line cards (LC0 to LC23) 14, FIG. 2 can be provided. Each line card provides 144 4× ports (24 stacked 168-circuit cable connectors). Each line card plugs horizontally into the midplane from the front.

Up to 16 hot-pluggable power supply units (PS0-PS16) 16, FIG. 1 are each plugged into the chassis 10 from the rear. Each power supply unit 16 has an alternating current (AC) power supply inlet (not shown). The power supply units 16 plug into a power distribution board (PDB), which is not shown in FIGS. 1 and 2. Two busbars (not shown in FIGS. 1 and 2), one per group of 8 power supply units, distribute direct current (DC) supply to the line cards 12 and the fabric cards 14.

Two hot-pluggable Chassis Management Controllers (CMCs) 18, FIG. 2 plug into the power distribution board from the front. Each chassis management controller 18 comprises a mezzanine card.

The power distribution board is a passive power distribution board that supports up to 16 power supply units DC connectors and 2 chassis management controller slot connectors. The power distribution board connects to the midplane through ribbon cables that carry low-speed signals.

In the present example, up to 144 fan modules (Fan#0-Fan#143) 20 are provided, with 8 fan modules per fabric card 12 in the present instance. Cooling airflow is controlled to be from the front to the rear, using redundant fans on the fabric cards to pull the air from the line cards 14 through openings (not shown in FIGS. 1 and 2), in the midplane. The power supply units 16 have their own fans for cooling with the air exiting through the rear of the chassis. The power supply units 18 are also used to cool the chassis management controllers 18.

Figure 3:
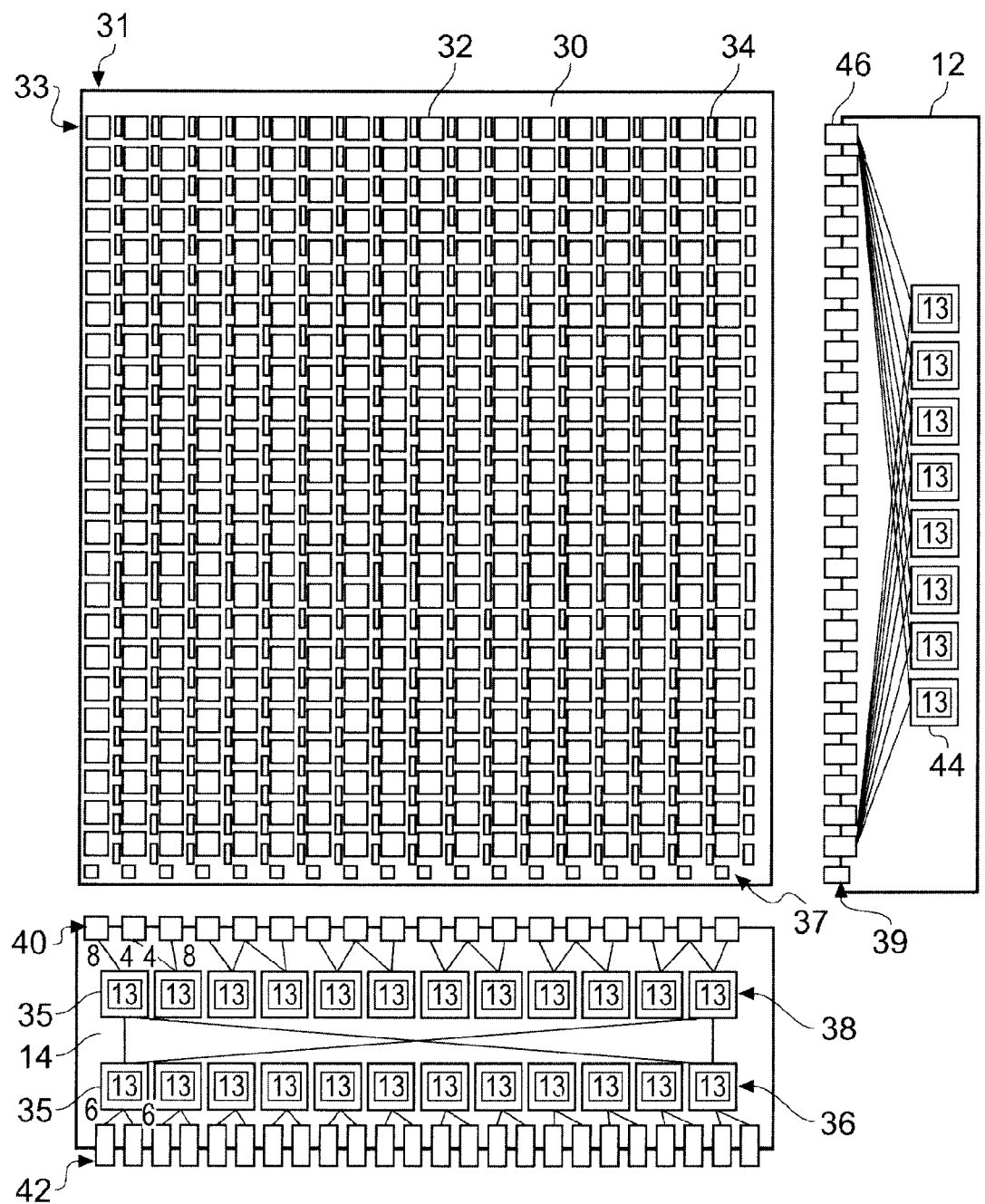
FIG. 3 is a schematic representation of a midplane illustrating the logical connectivity through the midplane between cards at the rear and cards at the front orientated orthogonally with respect to each other.

FIG. 3 is a schematic representation of a printed circuit board 30, which is configured as a midplane 30 in the switch chassis 10. The midplane 30 is configured in an orthogonal manner such that each fabric card 12 can connect to each of the line cards 14 without requiring any signal traces on the midplane 30. The orthogonal midplane design can provide excellent signal integrity in excess of 10 Gbps per differential pair.

Also, although the fabric cards and the switch cards are described as being orthogonal to each other, they do not need to be exactly orthogonal to each other. Indeed, it should be appreciated that in an alternative embodiment they could be angled with respect to each other but need not be exactly orthogonal to each other.

The midplane 30 is represented schematically to show an array of midplane connector pairs 32 as black squares with ventilation openings shown as white rectangles. Each midplane connector pair 32 comprises a pair of connectors (to be explained in more detail later) with one connector on a first face of the midplane and a second connector on the other face of the midplane, the first and second connectors being electrically interconnected by way of pass-through vias (not shown in FIG. 3) formed in the midplane 30. As will be explained later, the first and second connectors of a midplane connector pair 32 are each multipath connectors. They are arranged orthogonally with respect to one another such that a first midplane connector of a midplane connector pair 32 is connectable to a fabric card 12 on a first side of the plane 30 in a first orientation and a second midplane connector of the midplane connector pair 32 is connectable to a line card on a second side of the plane 30 in a second orientation substantially orthogonally to the first orientation.

In an example described herein, each of the first connectors of the respective midplane connector pairs 32 of a column 31 of midplane connector pairs 32 can be connected to one fabric card 12. This can be repeated column by column for successive fabric cards 12. In an example described herein, each of the second connectors of the respective midplane connector pairs 32 of a row 33 of midplane connector pairs 32 can be connected to one line card 14. This can be repeated row by row for successive line cards 14. As a result, the midplane can be populated by vertically oriented fabric cards 12 on the first side of the midplane and horizontally orientated line cards 12 on the second side of the midplane 30.

In the present example the midplane 30 provides orthogonal connectivity between fabric cards 12 and the line cards 14 using orthogonal connector pairs. Each orthogonal connector pair provides 64 differential signal pairs, which is sufficient to carry the high-speed signals needed as well as a number of low-speed signals. The orthogonal connector pairs are not shown in FIG. 3, but are described later.

The midplane 30 is also configured to provide 3.3 VDC standby power distribution to all cards and to provide I2C/System Management Bus connections for all fabric cards 12 and line cards 14.

Another function of the midplane 30 is to provide thermal openings for a front-to-rear airflow. The white holes in FIG. 3 (e.g., hole 34) form openings 34 in the midplane for airflow. In this example the midplane is approximately 50% open for airflow.

The fabric cards 12 each support 24 connectors and the line cards 14 each support 18 connectors.

FIG. 3 also illustrates an example of how the fabric cards 12, the midplane 20 and the line cards 14 interconnect. In this example there are 24 switch chips on a line card 14 and 8 chips on each of the 18 fabric cards 12.

As previously mentioned a 5-stage Clos fabric has a size $n*n/2*n/2$ in which n is the size of the switch element. The example switch element in FIG. 3 has n equal to 24 ports. Each line card 14 has 24 chips in 2 rows with 12 chips in each row. Each of 12 ports of each switch chip 35 in a first row 36 of the line card 14 is connected to 2 cable connectors 42, with 6 ports per cable connector. There are a total of 24 cable connectors per line card 14. Each cable connector can accommodate two physical independent cables that each carries 3 ports (links). Each cable connector 42 can accommodate 6 ports. The remaining 12 ports of each switch chip 35 in the first row 26 is connected to one chip 35 each in a second row 38 of chips 35.

There are 18 midplane connectors 32 per line card 14. Each midplane connector 32 provides one physical connection to one fabric card 14. Each midplane connector 32 can accommodate 8 4× links (there are 8 differential pairs per 4× link and a total of 64 differential pairs provided by the orthogonal connector)

12 ports of each of the switch chips 35 in the second row 38 of the line card 14 are connected to 2 line card connectors 40 that are used to connect the line card 14 to the midplane connectors 32 and thereby with the fabric cards 12 through the orthogonally oriented midplane connector pair. Of the 12 ports per switch chip 35, eight ports are connected to one line card connector 40, and the remaining four ports are connected to another line card connector 40 as represented by the numbers 8 and 4 adjacent the two left hand switch chips 35 in the second row 38. 2 switch chips are thereby connected to a group of 3 line card connectors 40 and hence to a group of three midplane connectors pairs 32.

The remaining 12 ports of each switch chip 35 in the second row 38 of the line card 14 are connected to each of the 12 switch chips 35 in the first row 36 of the line card 14.

At the fabric card 12 all links through an orthogonally oriented midplane connector pair 32 are connected to one line card 14. A single orthogonal connector 46 carries 8 links. These links are connected to one switch element 44 each at the fabric card 12.

Also shown in FIG. 3 are power connectors 37 on the midplane and power connectors 39 on the fabric cards 12.

There has been described a system with 24 line cards with 144 ports each, realized through 48 physical cable connectors that each carry 3 links. The switch fabric structure of each line card 14 is fully connected, so the line card 14 itself can be viewed upon as a fully non-blocking 144 port switch. In addition each line card 14 has 144 links that are connected to 18 fabric cards. The 18 fabric cards then connect all the line cards 14 together in a 5-stage non-blocking Clos topology.

Figure 4A:
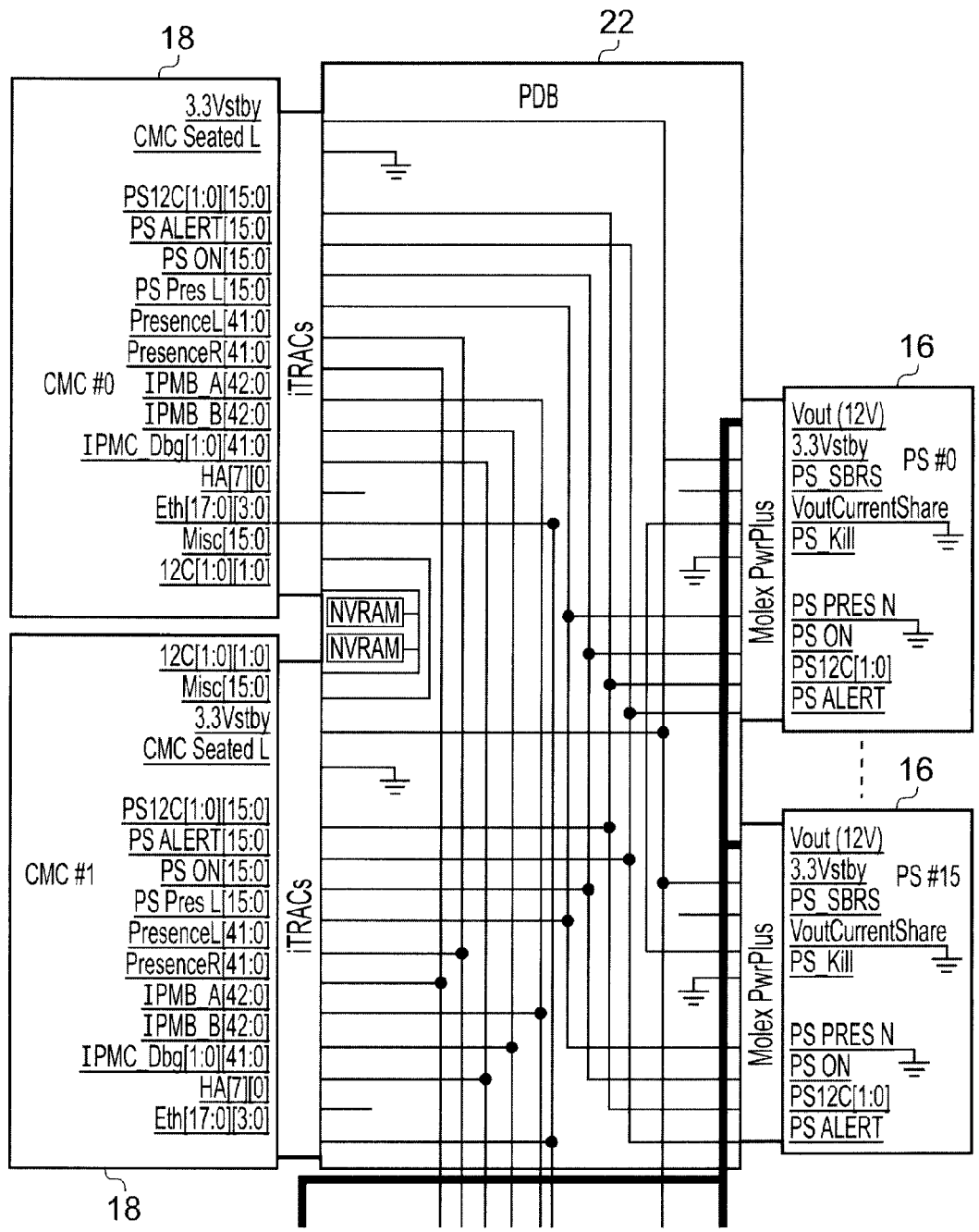
FIG. 4, formed of FIGS. 4A and 4B, is a schematic diagram of an example management infrastructure.
Figure 4B:
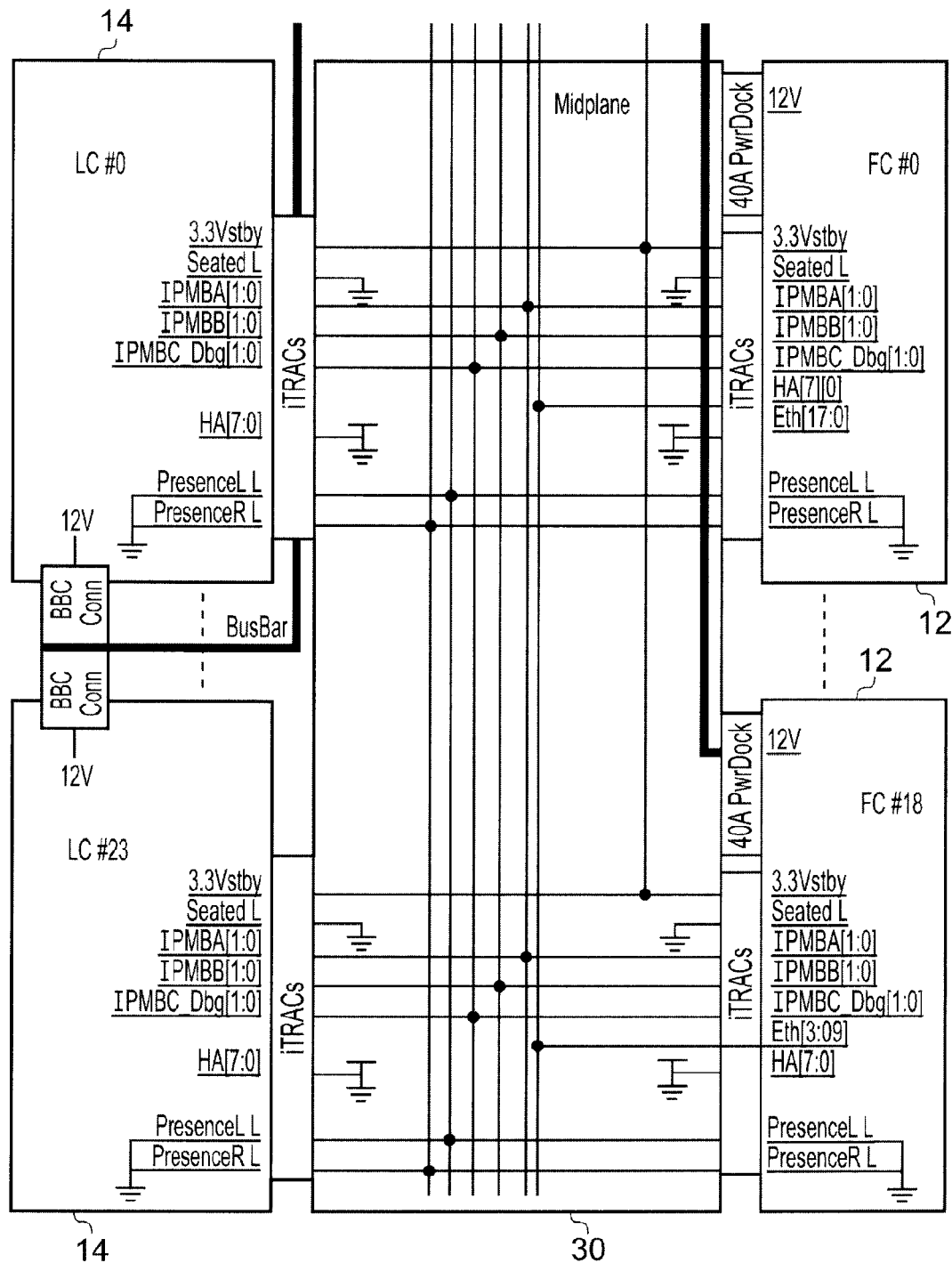

FIG. 4, formed from FIGS. 4A and 4B, is a schematic diagram of an example management infrastructure. This example provides redundant chassis management controllers 18. In addition each fabric card 12 and line card 14 supports an management controller. There are redundant management connections from each chassis management controller 18 to each of the fabric card and line card management controllers. In addition there are I2C connections to each of the power supply units 16. The management connections pass between the fabric cards 12, the line cards 14, the power supply units 16 and the chassis management cards 18 via the midplane and the power distribution board 22 in the present example.

FIGS. 5 to 11 provide various schematic views of an example of a switch chassis.

Figure 5:
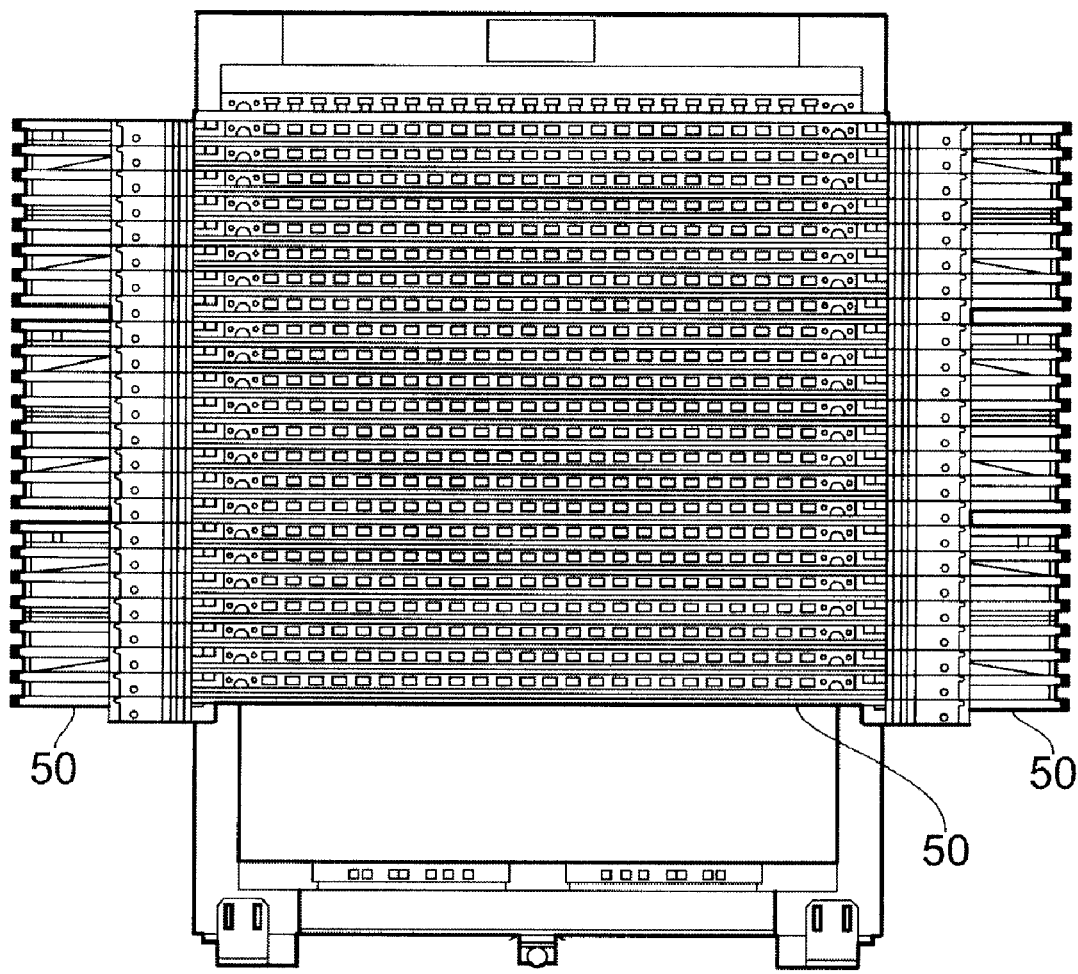
FIGS. 5 to 11 are views of an example of a switch chassis.
Figure 6:
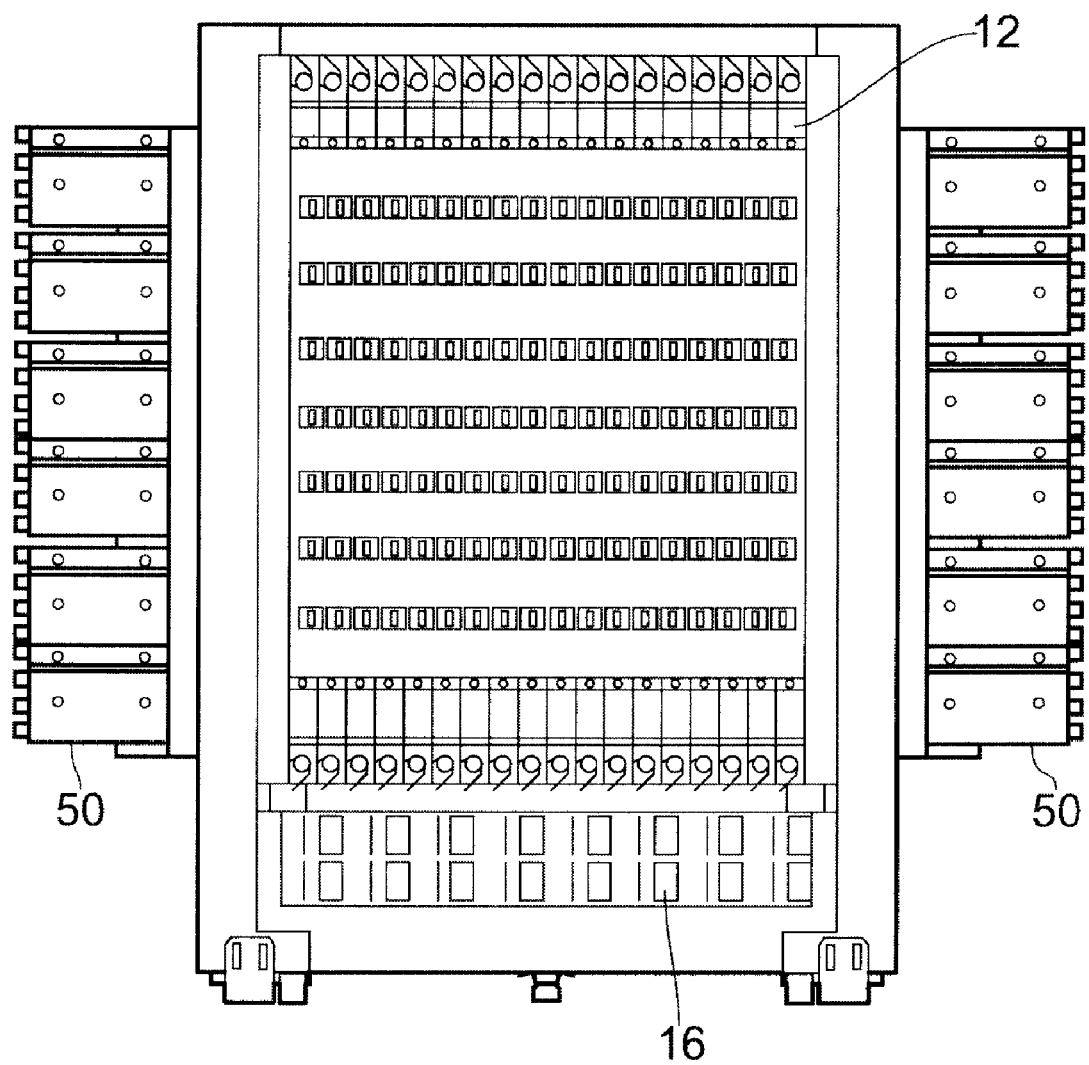
Figure 7:
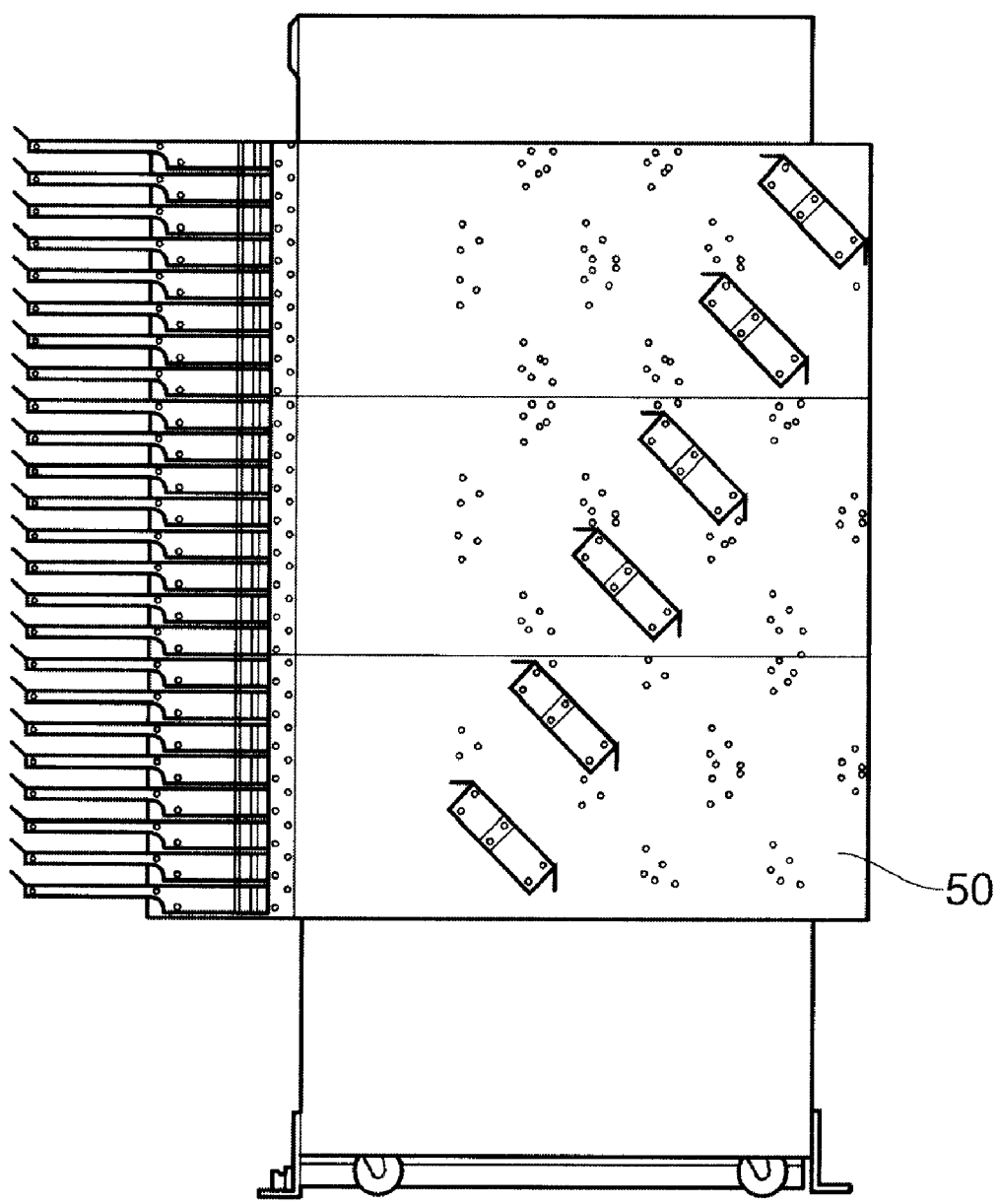
Figure 8:
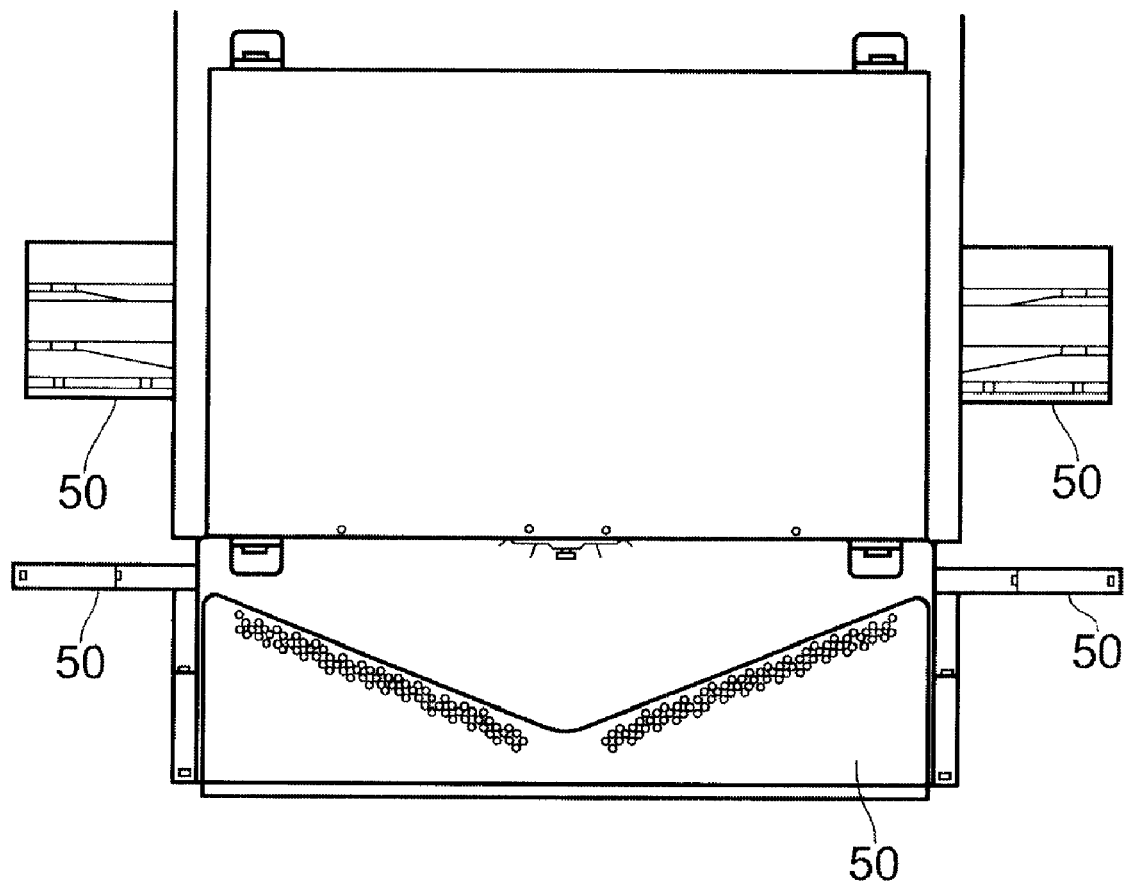
Figure 9:
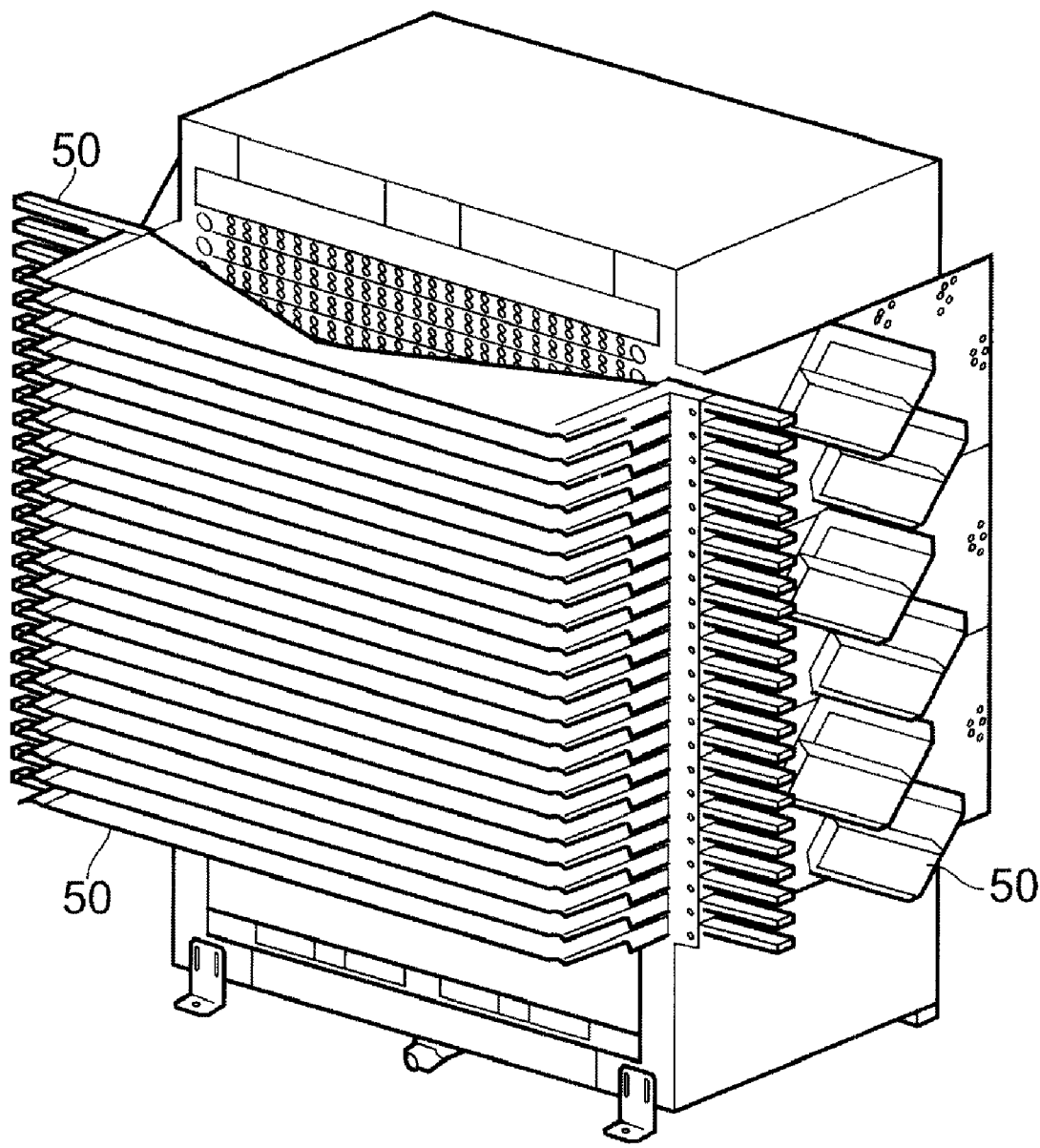
Figure 10:
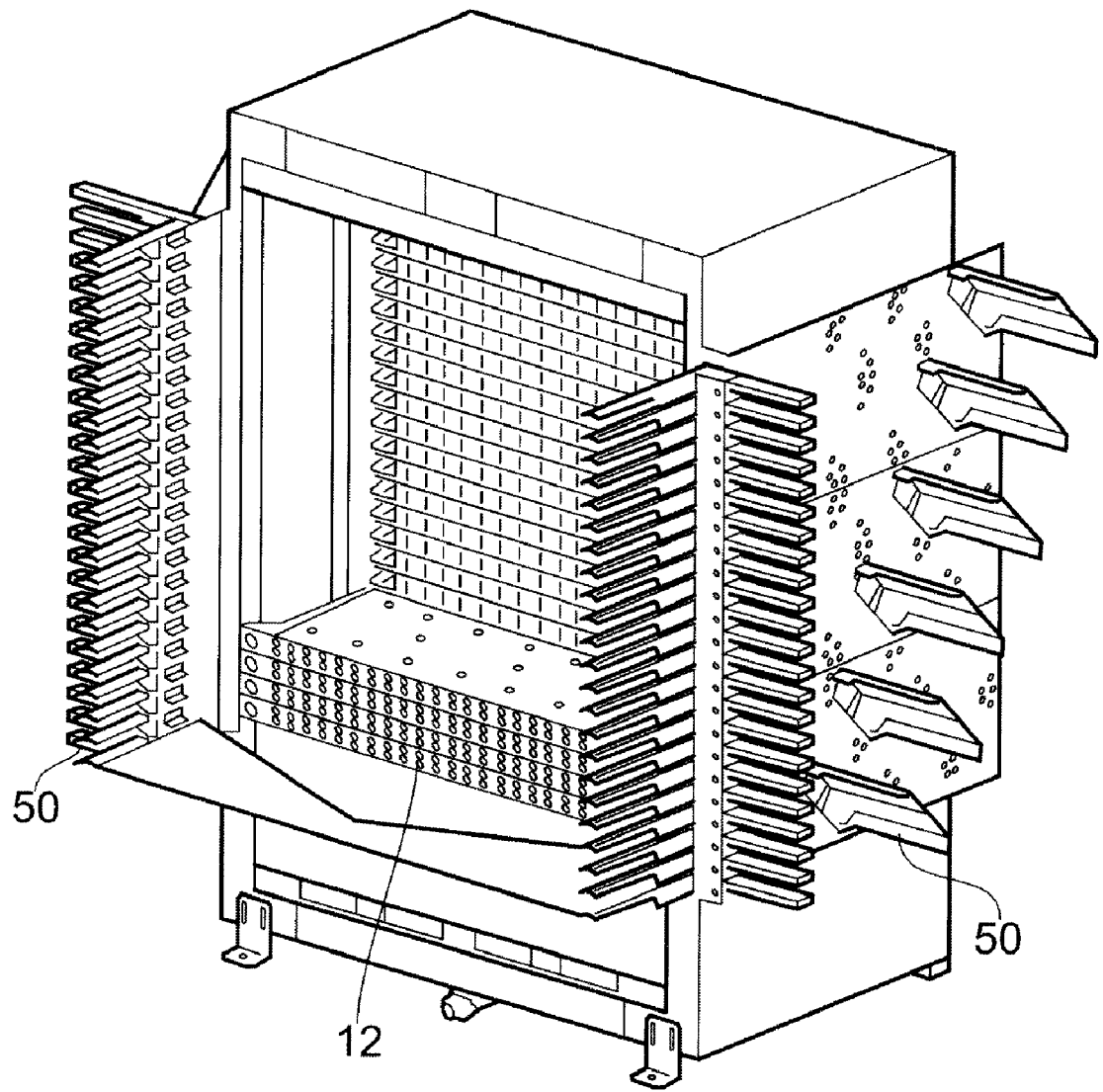
Figure 11:
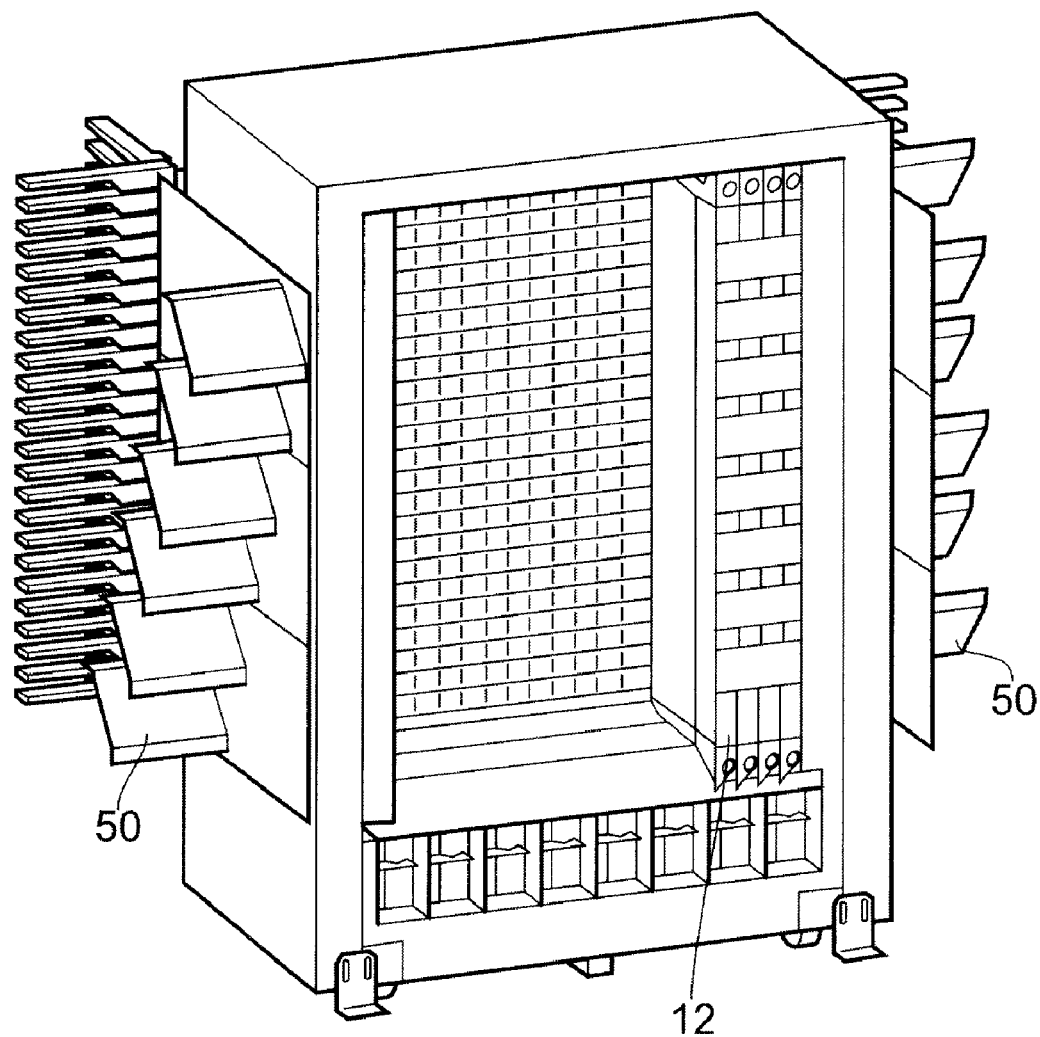

FIG. 5 is a front view of the switch chassis 10 showing cable management structures 50. FIG. 6 is a rear view of the switch chassis 10 showing the fabric cards 12, the power supply units 16 and cable management structures 50. FIG. 6 is a side view of the switch chassis 10 further showing the cable management structures 50. FIG. 8 is a side view of the switch chassis 10 further showing the cable management structures 50. FIG. 9 is an isometric view of the switch chassis 10 from the line card 14 (front) side further showing the cable management structures 50. FIG. 10 is an isometric view of the switch chassis 10 from the line card 14 (front) side showing four line cards 12 installed horizontally in the chassis 10 and part of the cable management structures 50. FIG. 11 is an isometric view of the switch chassis 10 from the fabric card 12 (rear) side showing four fabric cards 12 installed vertically in the chassis 10 and part of the cable management structures 50.

Figure 12:
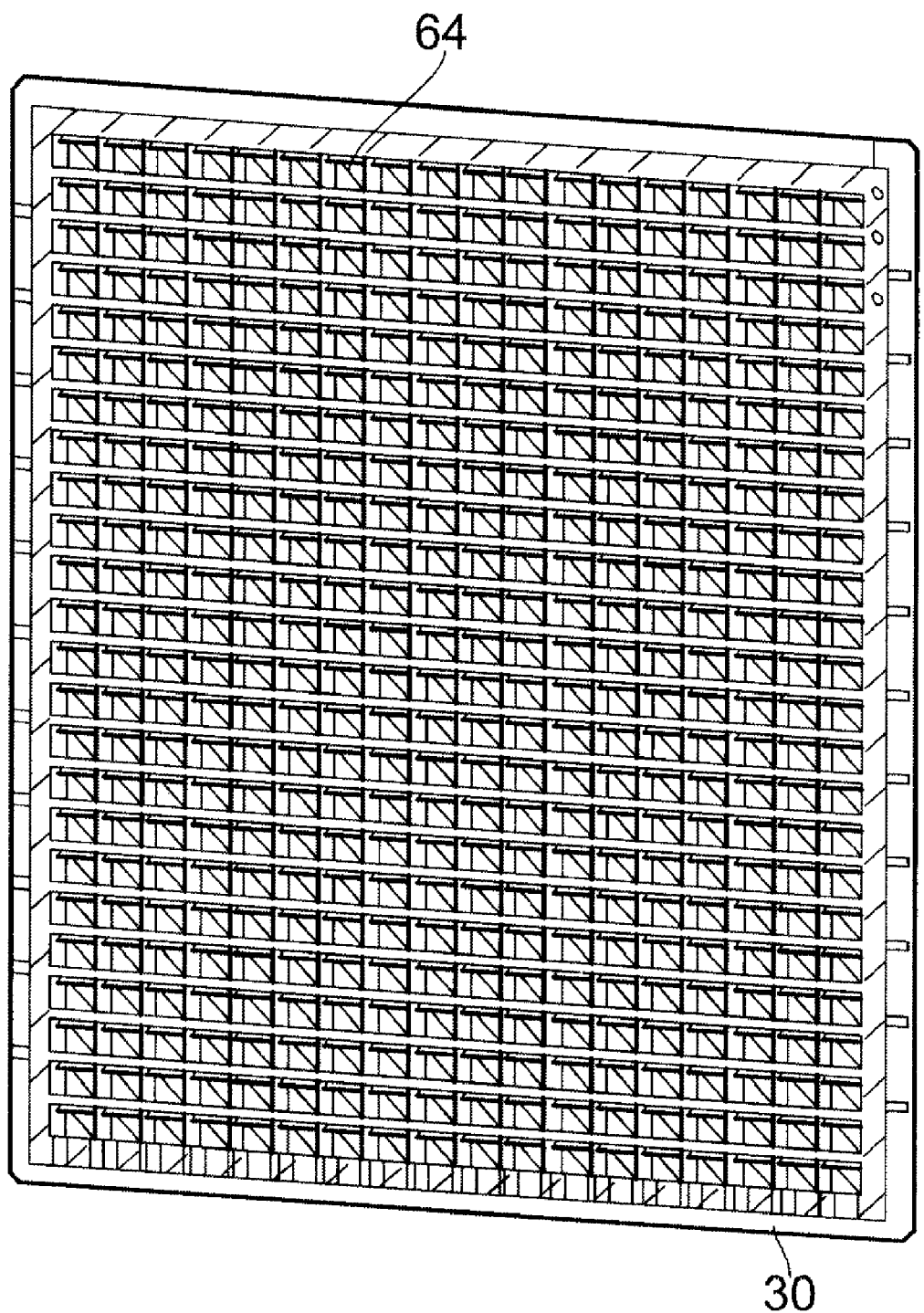
FIG. 12 is a first isometric view of an example of a midplane.
Figure 13:
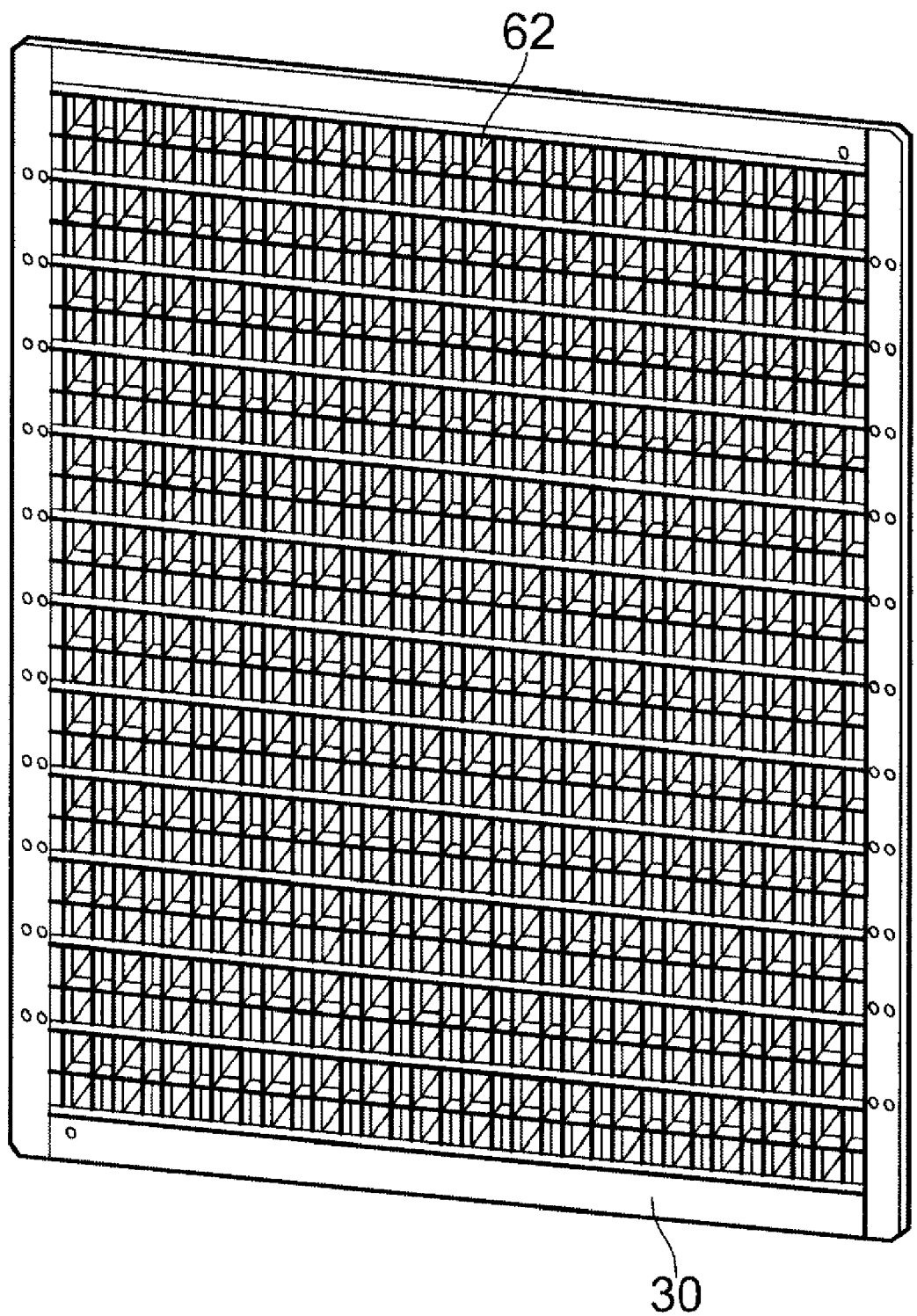
FIG. 13 is a further isometric view of an example of a midplane.

FIGS. 12 and 13 provide various schematic views of an example of a midplane 30. FIG. 12 is an isometric view of the midplane 30 from the line card 14 (front) side and FIG. 13 is an isometric view of the midplane 30 from the fabric card 12 (rear) side. FIG. 12 shows the array formed from rows and columns of the second connectors 64 of the midplane connectors pairs 32 described with reference to FIG. 3. FIG. 13 shows the array formed from rows and columns of the first connectors 62 of the midplane connectors pairs 32 described with reference to FIG. 3.

Figure 14:
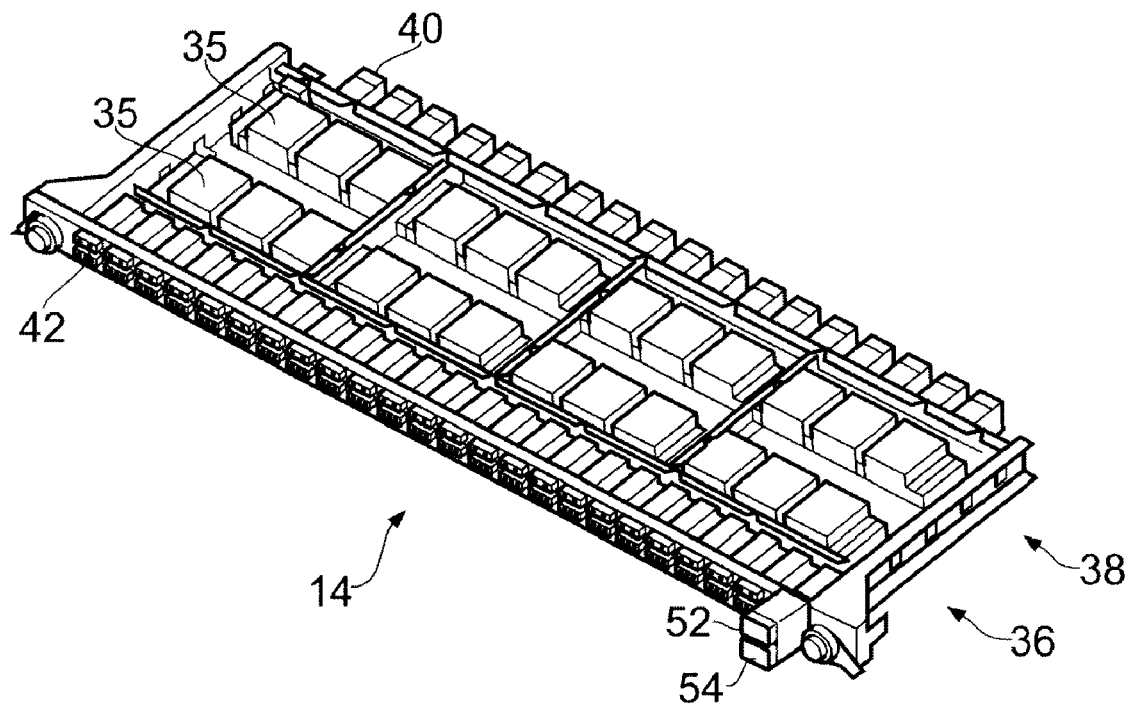
FIG. 14 is an isometric view of an example of a line card.

FIG. 14 is an isometric view of an example of a line card 14. This shows the first and second rows 36 and 38 of switch chips 35, the line board connectors 40 and the cable connectors 42. As can be seen in FIG. 14, the cable connectors 42 are stacked double connectors such each cable connector can connect to two cables 52 and 54.

Figure 15:
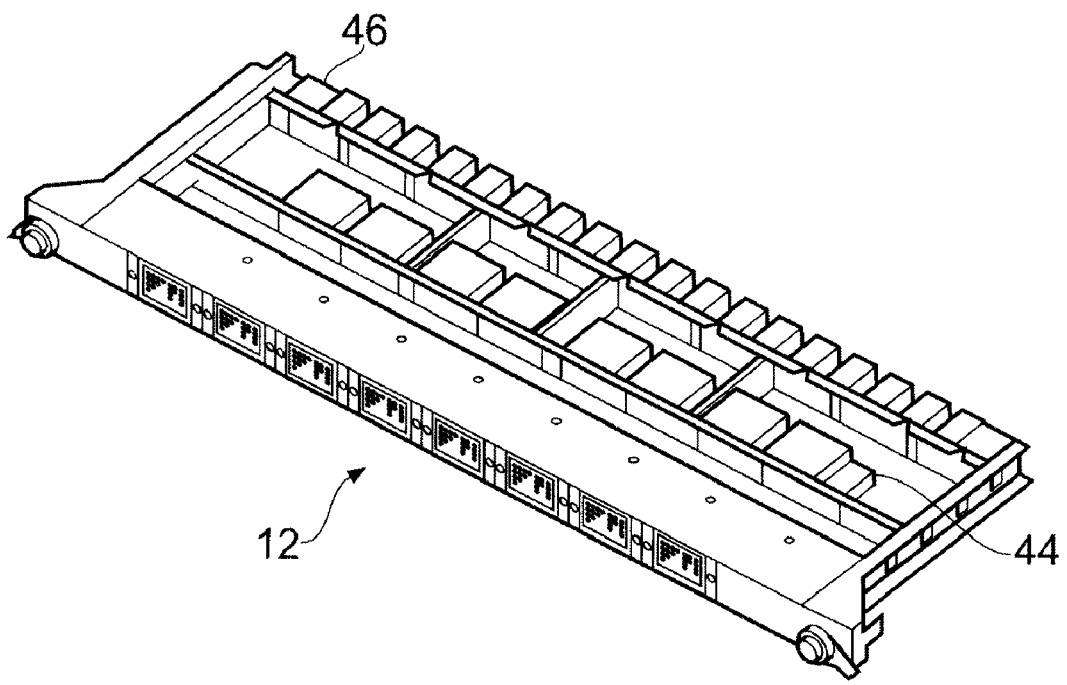
FIG. 15 is an isometric view of an example of a fabric card.

FIG. 15 is an isometric view of an example of a fabric card 12. This shows the fabric card connectors 46 and the switch elements 44.

Figure 16:
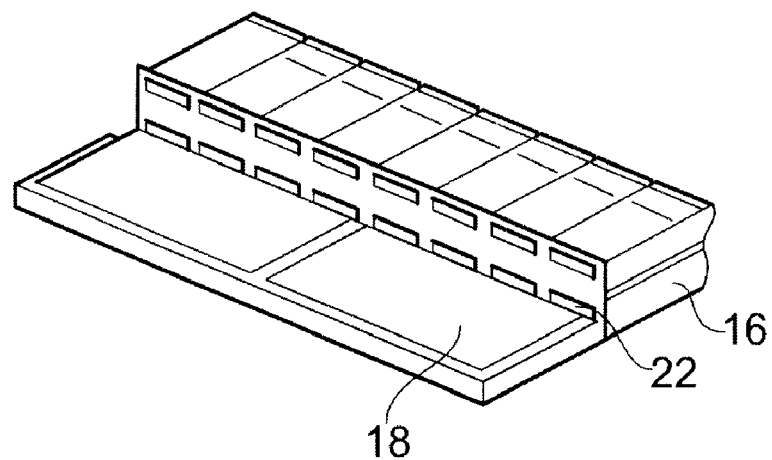
FIG. 16 is schematic representations of part of a switch chassis.
Figure 17:
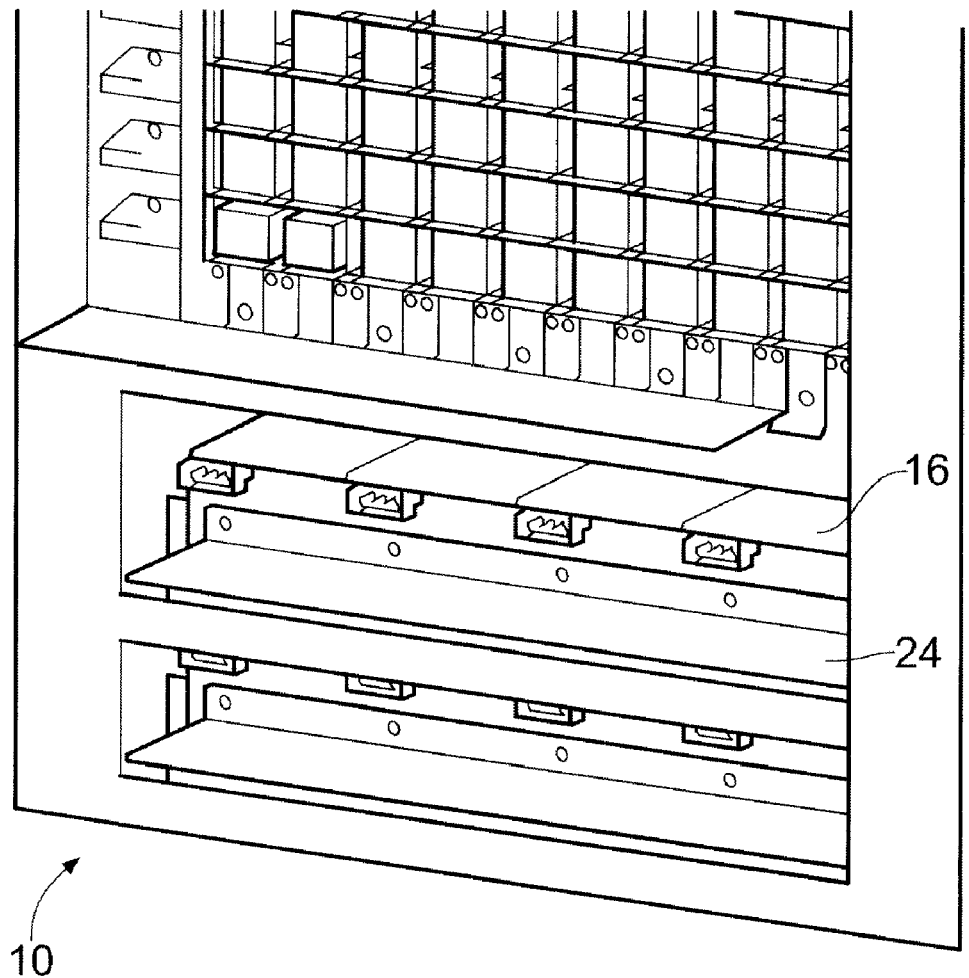
FIG. 17 is a further schematic representation of part of a switch chassis.

FIG. 16 is a schematic representation of an example of two chassis management controllers 18 plugged into one side of a power distribution board 22 and 16 power supply units 16 plugged into the other side of the power distribution board 22. In the present example, the chassis management controllers 18 are plugged into the front side of the power distribution board 22 and the power supply units 16 are plugged into the rear side of the power distribution board 22 as mounted in the switch chassis. FIG. 17 illustrates bus bars 24 for a 3.3V standby supply.

In the present example the midplane 30 is a passive printed circuit board that has dimensions of 1066.8 mm (42")×908.05 mm (35.75")×7.1 mm (0.280"). The active area is 40"×34". 864 8×8 midplane connectors (432 midplane connectors per side) are provided. There is a ribbon cable connection the power distribution board 22 and a 3.3V standby copper bar to the power distribution board 22.

In the present example a fabric card 12 comprises a printed circuit board with dimensions of 254 mm (10")×1016 mm (40")×4.5 mm (177"). It comprises 24 8×8 fabric card connectors 46, one power connector 39, 8 fan module connectors and 8 switch chips 44.

In the present example a line card 14 comprises a printed circuit board with dimensions of 317.5 mm (12.5")×965.2 mm (38")×4.5 mm (177"). It comprises 24 stacked cable 168-circuit connectors 42, 18 8×8 card connectors 40, 1 bus-bar connector and 24 switch chips 35.

In the present example a power distribution board 22 comprises a printed circuit board, 16 power supply DC connectors, 14 6×6 card connectors (7 connectors per chassis management card 18, ribbon cable connectors for low-speed connectivity to the midplane 30, and a 3.3V standby copper bar to the midplane 30.

In the present example a chassis management card 18 comprises 14 6×6 card connectors (7 connectors per chassis management card, two Rj45 connectors with magnetics for Ethernet available on a chassis management card panel, two Rj45 connectors for serial available at the chassis management card panel, three Rj45 for line card/fabric card debug console access at the chassis management card panel, three HEX rotary switches used to select between which line card/fabric card debug console is connected to the three Rj45s above, and a 220-pin connector for the mezzanine.

In the present example a mezzanine has dimensions: 92.0 mm×50.8 mm and comprises 4 mounting holes for screws with either 5 mm or 8 mm standoff from the chassis management card board, a 220-pin connector for connectivity to chassis management board.

Figure 18:
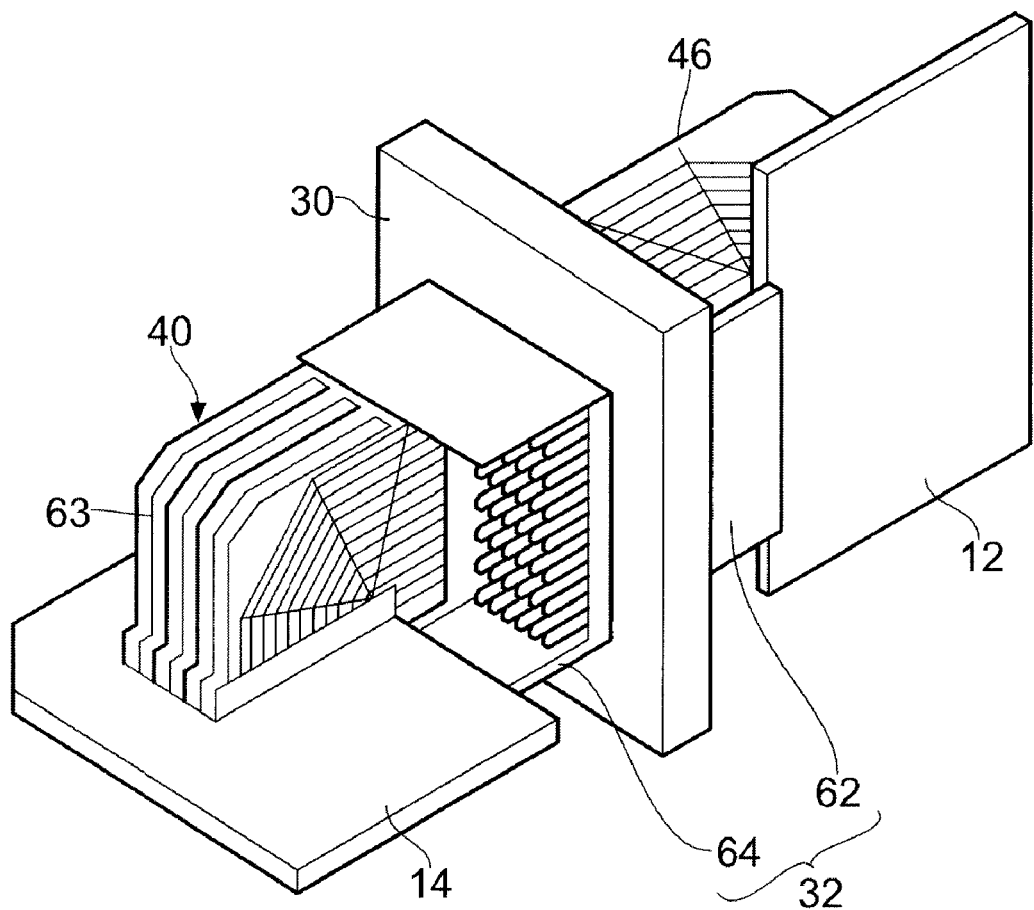
FIG. 18 is a schematic representation of the connections of two cards orthogonally with respect to each other.

FIG. 18 is a schematic isometric view of an example of a midplane connector pair 32. As can be seen in FIG. 18, the connector comprises a first, fabric side, connector 62 and a second, line card side, connector 64. In this example, each of the connector 62 and 64 is substantially U-shaped and comprises an 8×8 array of contact pins.

It will be noted that the second connector 64 of the midplane connector pair 32 is rotated through substantially 90 degrees with respect to the first connector 62. The first connector 62 is configured to connect to a corresponding fabric card connector 46 of a fabric card 12. The second connector 62 is configured to connect to a corresponding fabric card connector 46 of a line card 14. Through the orientation of the second connector 64 of the midplane connector pair 32 substantially orthogonally to the orientation of the first connector 62, it can be seen that the line card 14 is mounted substantially orthogonally to the fabric card 12. In the present example the line card 14 is mounted substantially horizontally and the fabric card is mounted substantially vertically 12.

Each of the contact pins on the connector 62 is electrically connectable to a corresponding contact of the fabric card connector 46. Each of the contact pins on the connector 64 is electrically connectable to a corresponding contact of the line card connector 40. The connector pins of the respective connectors 62 and 64 are connected by means of pass-through vias in the midplane 30 as will now be described in more detail.

Figure 19:
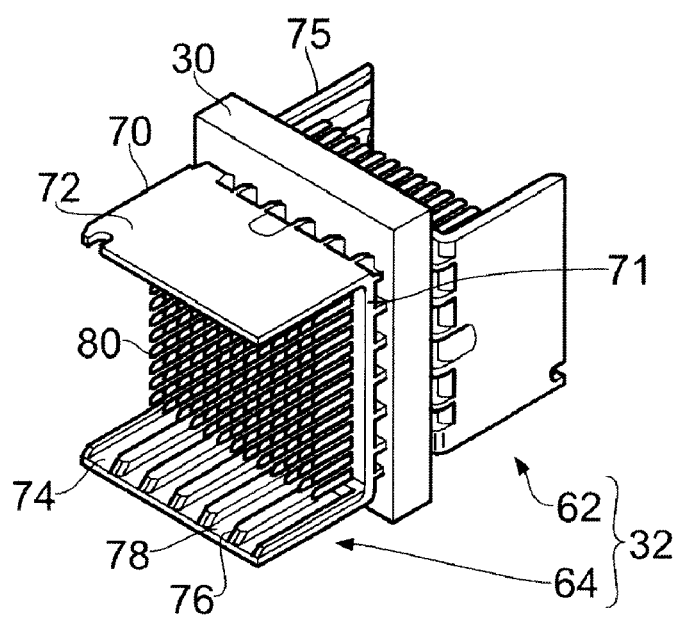
FIG. 19 is a schematic representation of an example of orthogonally arranged connectors.

FIG. 19 illustrates an example of the configuration of a first midplane connector 62 and a second midplane connector 64 of a midplane connector pair 32 in more detail. In the example shown in FIG. 19 that second connector 64 (the line card side connector) comprises a substantially U-shaped frame 70 including a substantially planar base 71 and first and second substantially planar walls 72 and 74 that extend at substantially at 90 degrees from the base 71. The inside edges of the first and second substantially planar sides 72 and 74 are provided with ridges 76 and grooves 78 that provide guides for the line card connector 40.

As can be seen in FIG. 18, the line card connector 40 has a structure that comprises a plurality of contact planes 63 that are aligned side by side, such that it has a generally planar construction that extends up from the line card 14. Line card connector planes comprise printed circuit boards carrying traces leading to contacts. The traces and contacts can be provided on both sides of the printed circuit boards of the line card connector planes.

By comparing FIGS. 18 and 19, it can be seen that each contact plane 63 of the line card connector 40 can be entered into a respective one of the grooves 78 so that connectors of the line card connector 40 can then engage with contact pins 80 of the second connector 64. In the case of the line card side connector portion 64, the orientation of second connector 64 and the grooves 78 therein means that the line card 12 is supported in a substantially horizontal orientation. In the example shown in FIG. 19, an 8×8 array of connector pins 80 is provided.

The first midplane connector 62 (fabric card side connector) of the midplane connector pair 32 has substantially the same form as the second midplane connector 62 of the midplane connector pair 32, except that it is oriented at substantially 90 degrees to the second midplane connector 64. In this example the second midplane connector 62 comprises a substantially U-shaped support frame 75 including a substantially planar base and first and second substantially walls and that extend at substantially at 90 degrees from the base. The inside edges of the first and second substantially planar sides are provided with ridges and grooves that provide guides for the fabric card connector 46. The fabric card connector 46 has the same basic structure as that of the line card connector 40 in the present instance. Thus, in the same way as for the line card connector, each of a plurality of contact planes of the fabric card connector 46 can be entered into a respective one of the grooves so that connectors of the fabric card connector 46 can then engage with contact pins of the first connector 62. The orientation of the first connector 62 and the grooves therein means that the fabric card 12 is supported in a substantially vertical orientation.

In the example illustrated in FIG. 19, the orthogonal connector 60 provides an 8×8 array of connector pins 80 is provided that can support supports 64 differential pairs or 32 bi-directional serial channels (two wires per direction) in a footprint of 32.2×32.2 mm.

As mentioned above, the contact pins of the first and second midplane connectors 62 and 64 of a midplane connector pair 32 are connected by means of pass through vias in the midplane.

Figure 20:
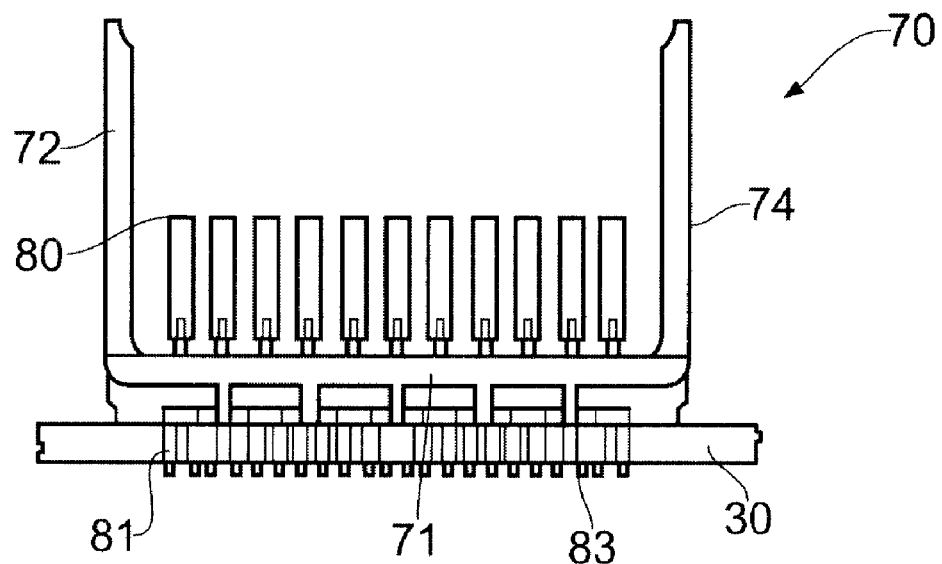
FIG. 20 is a schematic side view of one of the connectors of FIG. 19.

FIG. 20 illustrates a side view of an example of a midplane connector, for example the midplane connector 62 mounted on the midplane. In the example shown in FIG. 20 the midplane connector 64 comprises a substantially U-shaped frame 70 including a substantially planar base 71 and first and second substantially planar walls 72 and 74 that extend at substantially at 90 degrees from the base 71. The contact pins 80 are each connected to pairs of contact tails 81 that are arranged in sprung pairs that are arranged to be push fitted into pass through vias 83 in the midplane 30.

In use, the other midplane connector pair (e.g., the first midplane 62) of the midplane connector pair would be inserted into the pass through vias in the other side of the midplane 30 in the orthogonal orientation as discussed previously.

Figure 21:
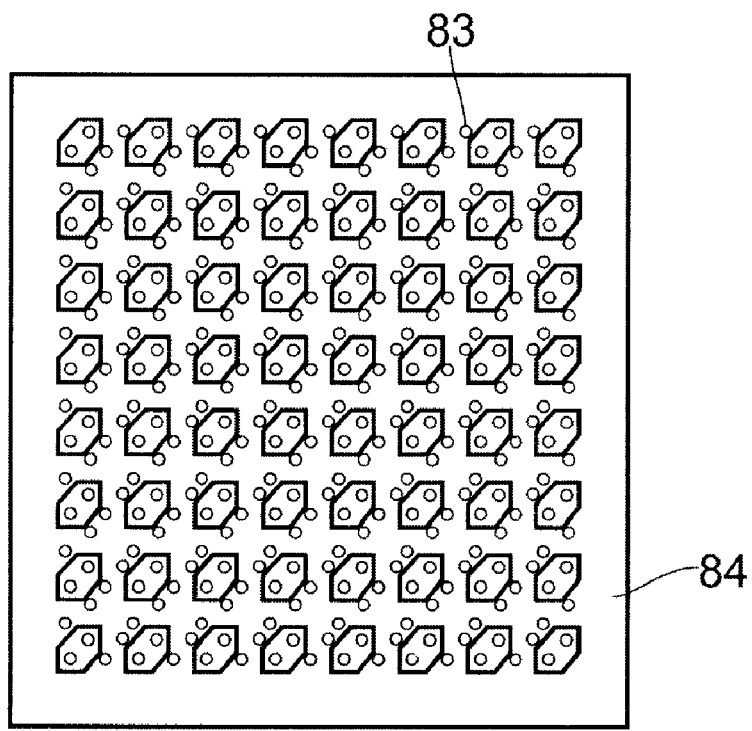
FIG. 21 is a plan view of an example configuration of vias for the orthogonal connector pairing of FIG. 19.
Figure 22:
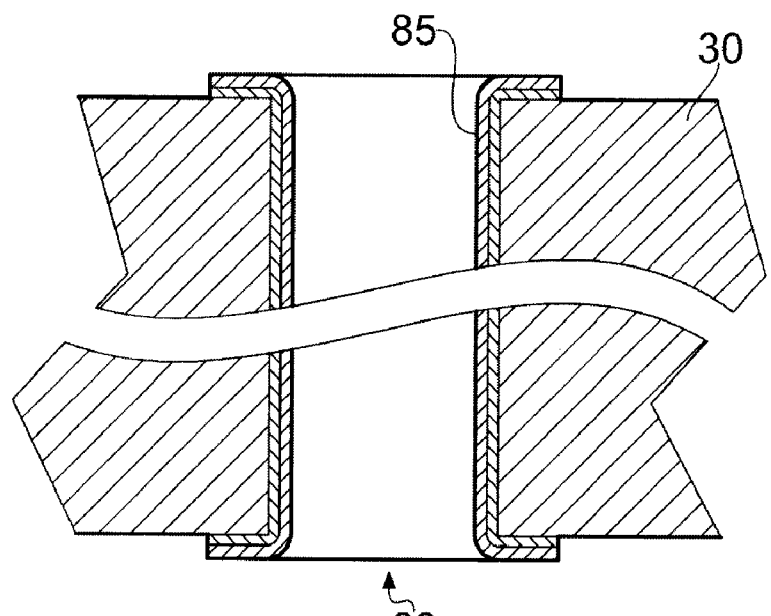
FIG. 22 is a cross-section through of a via.

FIG. 21 is a schematic representation of an area of the midplane for receiving the midplane connectors 62 and 64 of the midplane connector pair 32. This shows the array of vias 83. FIG. 22 is a schematic cross-section though such a via 83 in the showing the conductive wall 85 of the via 83. The conductive wall 85 can be formed by metal plating the wall of the via, for example.

Figure 23:
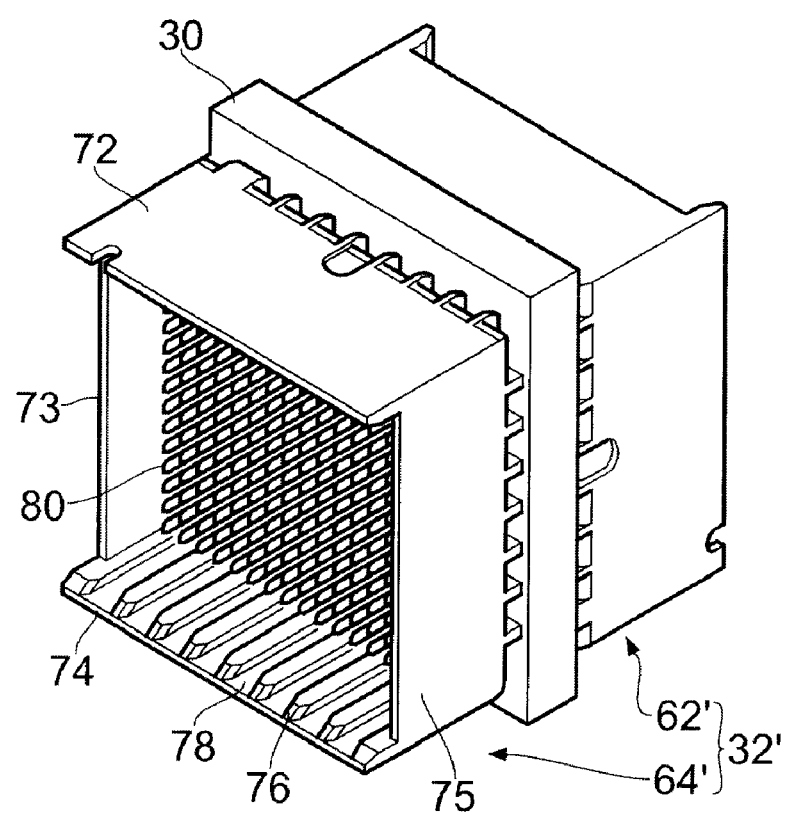
FIG. 23 is a schematic side view of example of an alternative to the connector of FIG. 20.

The examples of the midplane connectors described with reference to FIGS. 18 and 20 had a generally U-shape. However, other configurations for the midplane connectors are possible. For example FIG. 23 illustrates another example of a midplane connector pair 32', where the first and second midplane connectors 62' and 64' are generally the same as the first and second midplane connectors 62 and 64 described with reference to FIG. 19 except that, in addition to the first and second walls 72 and 74, third and fourth walls 73 and 75 are provided. The additional walls provide a generally box-shaped configuration that can facilitate the insertion and support for the cards to be connected thereto.

It will be appreciated that in other embodiments the first and second midplane connectors could have different shapes and/or configurations appropriate for the connections for the cards to be connected thereto.

Also, although in the above described embodiment the midplane connector pairs 32 are configured as first and second connectors 62 and 64, in another embodiment they could be configured as a single connector that is assembled in the midplane. For example, through connectors could be provided that extend through the midplane vias. The through connectors could be manufactured to be integral with a first connector frame (e.g., a U-shaped frame or a box-shaped frame as in FIGS. 19 and 23, respectively) and the contacts inserted through the vias from a first side f the midplane 30. Then a second connector frame could be inserted over the connectors on the second side of the midplane 30 in a mutually orthogonal orientation to the first connector frame.

The array of midplane connector pairs 32 as described above provides outstanding performance in excess of 10 Gbps over a conventional FR4 midplane because the orthogonal connector arrangements allow signals to pass directly from the line card to the fabric card without requiring any signal traces on the midplane itself. The orthogonal arrangements of the cards that can result from the use of the array of orthogonally arranged connector pairs also avoids the problem of needing to route a large number of signals on the midplane to interconnect line and fabric cards, minimizing the number of layers required. This provides a major simplification compared to existing fabric switches. Thus, by providing an array of such orthogonal connectors, each of a set of horizontally arranged line cards 14 can be connected to each of a set of vertically aligned fabric cards 12 without needing intermediate wiring.

Figure 24:
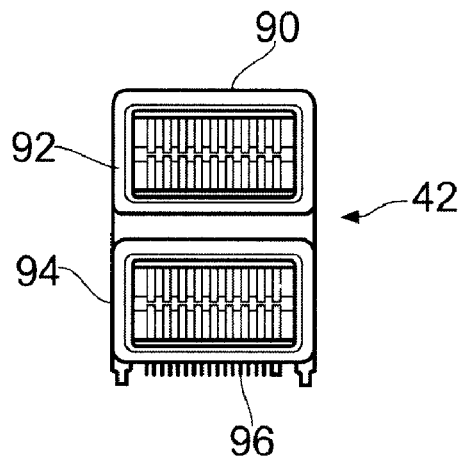
FIG. 24 is a schematic end view of an example cable connector.
Figure 25:
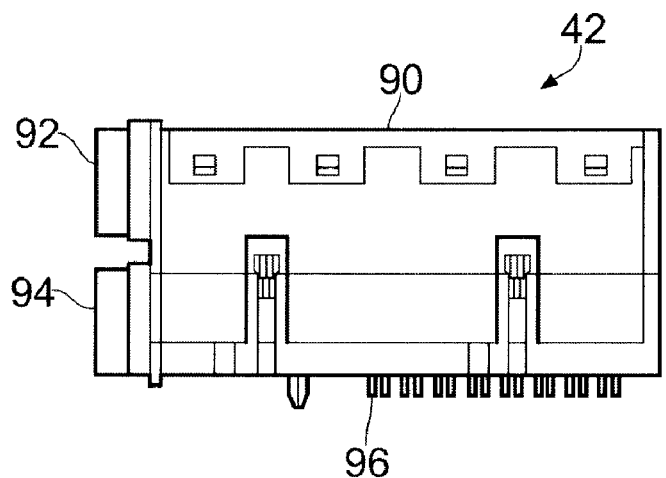
FIG. 25 is a schematic side view of the example cable connector.
Figure 26:
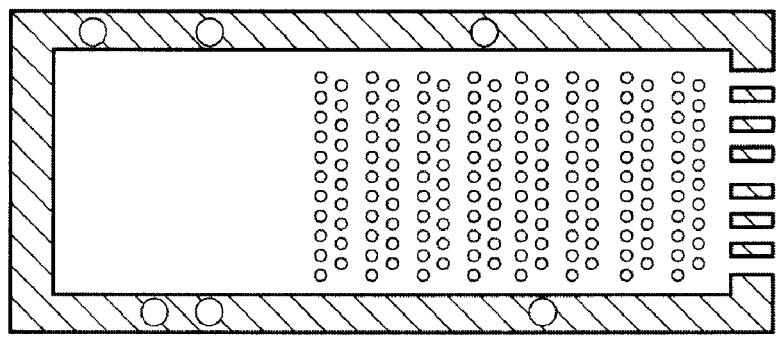
FIG. 26 represents a footprint of the cable connector.

FIGS. 24 and 25 provide an end view and a side view, respectively, of an example of a cable connector 42 as mentioned with reference to FIGS. 3 and 14. As shown in FIGS. 24 and 25, the cable connectors 24 and 25 include first and second cable connections 92 and 94 stacked within a single housing 90. This provides for a very compact design. Board contacts 96 are provided for connecting the connector to a line card 14. FIG. 26 is a plan view of the connector footprint for the board contacts 96 of the cable connector 42. The stacked arrangement facilitates the providing of line cards that are high density line cards supporting a 12× cable providing 24 line pairs with 3 4× links aggregated into a single cable. The cable connectors provide 12× cable connectors that are smaller than a conventional 4× connector, 3× denser than a standard InfiniBand 4× connector and electrically and mechanically superior. Using 12× cable (24 pairs) can be almost 50% more area efficient than three 4× cables and requires three times fewer cables to install and manage.

Figure 28:
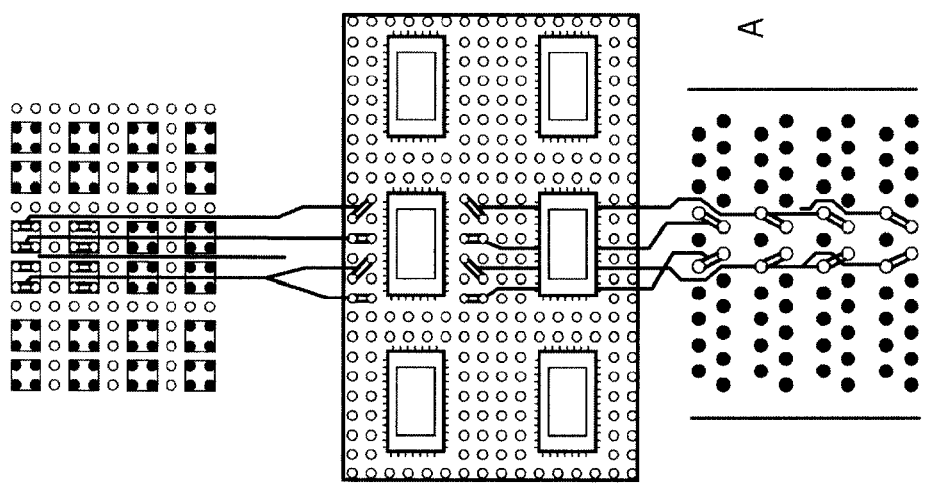
FIGS. 27 and 28 illustrate example of signal routing for a cable connector.
Figure 27:
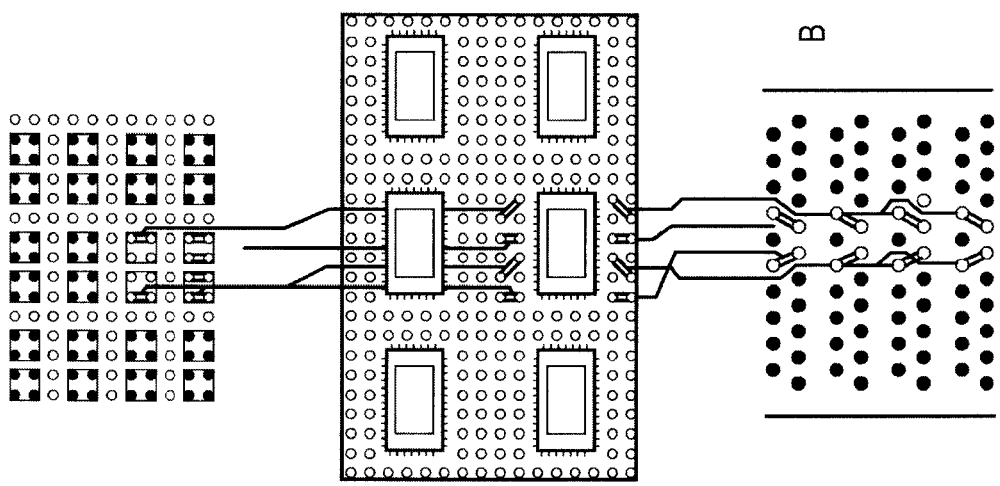

FIGS. 27 and 28 illustrate an example of the routing of signals from each of two 12× port sections 92 and 94 of a cable connector 42 to the equalizers and to a switch chip on a line card 14. FIG. 27 shown an example of routing from a first 12× port section. FIG. 28 shows an example of the routing from a second 12× port section. The transmit (Tx) lines are equalized, and can be connected directly from the switch chip to the cable connector. The signals can be routed on lower layers in order to minimize via stub effects.

Figure 29:
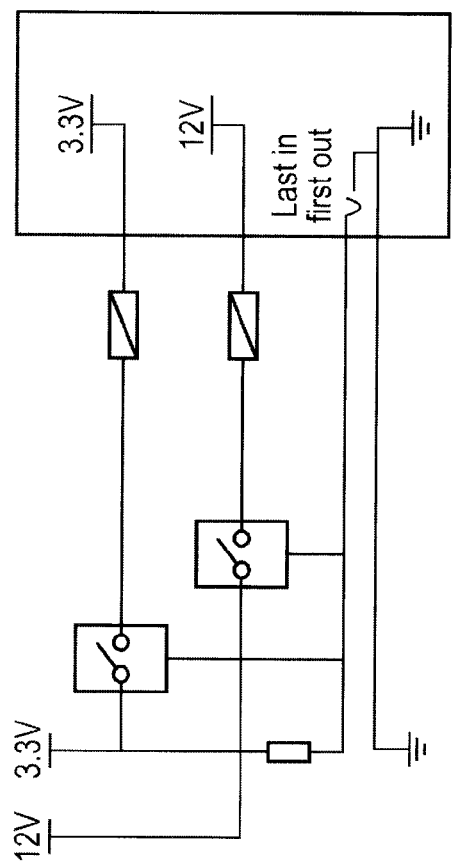
FIG. 29 illustrates an example of a power supply for the cable connector.
Figure 30:
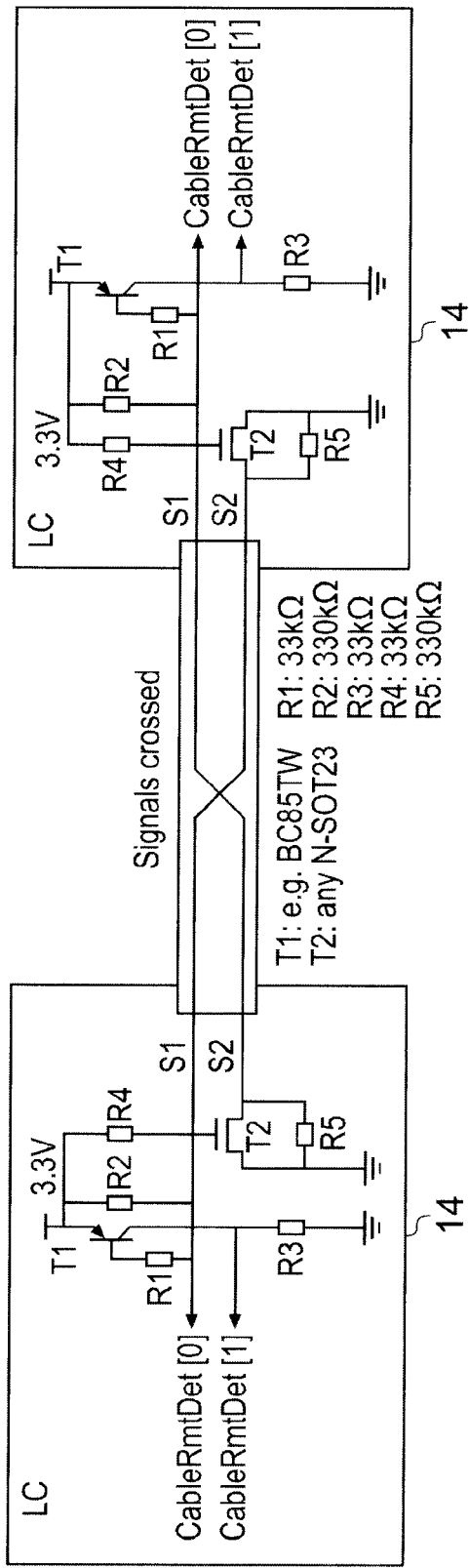
FIG. 30 illustrates an example of cable status sense detection circuitry.
Figure 31:
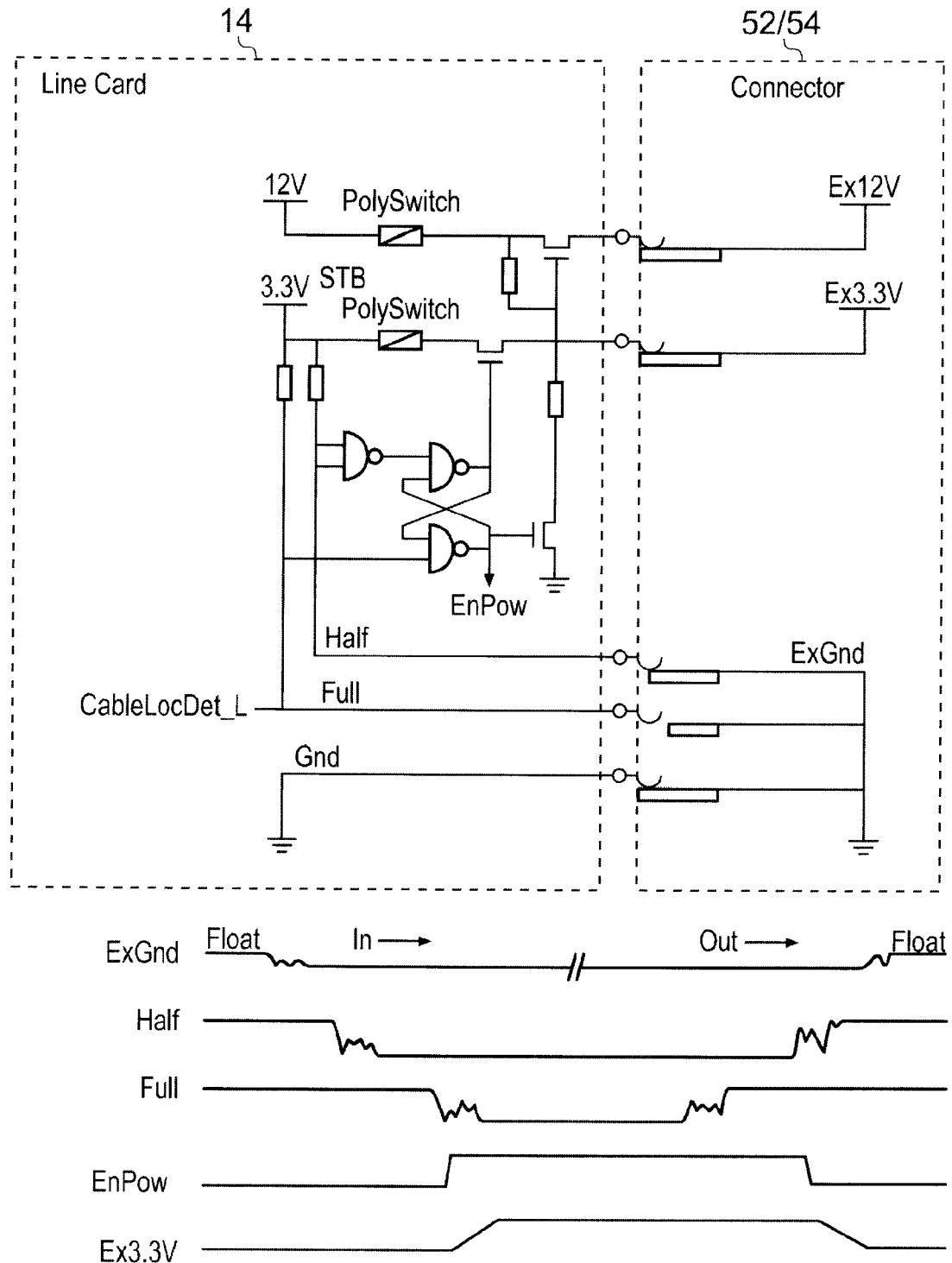
FIG. 31 illustrates an example of hot plug control circuitry.

FIG. 29 illustrates an example of a power supply for the cable connector and FIG. 30 illustrates an example of a cable status sense detection circuitry. The cable sense detection circuitry is operable to test from each end whether the other end is plugged or not, and, if plugged, to see if power from the power supply is on. Provisions are made such that "leaking" power from a powered to un-powered end is avoided. A valid status assumes that an active end is plugged. FIG. 31 is a schematic diagram of an example of a hot plug control circuit that enables hot plugging of cables. The switch chassis can thereby provide active cable support for providing active signal restoration at a cable connector. Active cable support can provides benefits of increased distances for copper cables as a result of active signal restoration at the connector, increased maximum cable distance by over 50%, using thinner and more flexible cables (e.g., reducing a cable diameter by up to 30%, which facilitates good cable management. A cable to connector interface can provide one, more or all of local and remote cable insertion detection, cable length indication, remote node power-on detection, remote power, a serial number and a management interface.

Figure 32:
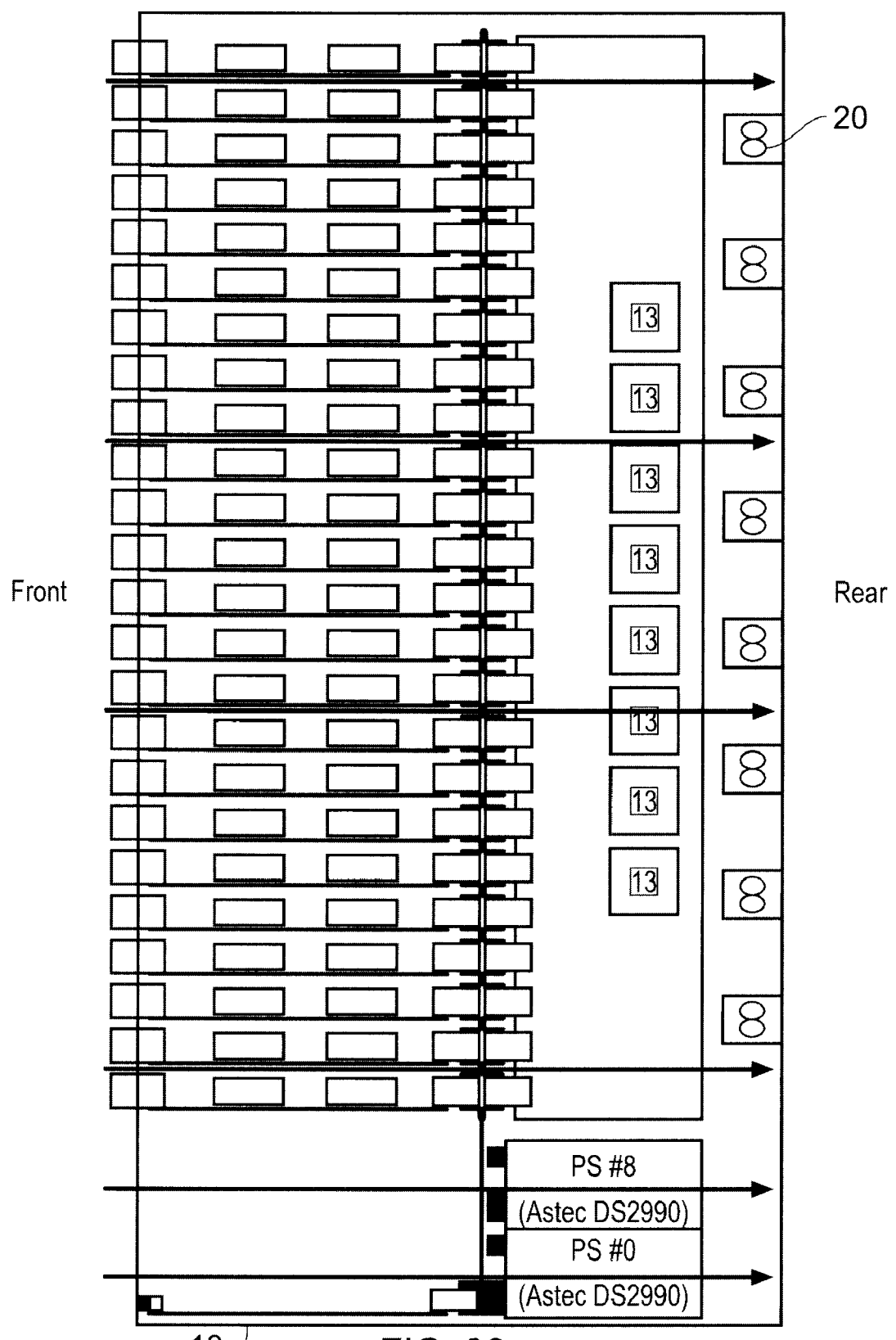
FIG. 32 is a schematic representation of airflow though a switch chassis.

FIG. 32 is a schematic representation of the airflow through an example switch chassis. As illustrated by the arrows, the airflow is from the front to the rear, being drawn through by fans 20 in the fabric cards 12 and the power supplies 18.

The air inlet is via perforations at the line card 14 front panel. Fans 20 at the fabric cards 12 pull air across the line cards, though the openings 34 in the vertical midplane 30 and across the fabric cards 12.

Line card cooling is naturally redundant since the fabric cards are orientate orthogonally to the line cards. In other words, cooling air over each line card is as a result of the contribution of the effect of the fans of the fabric cards along the line card due to the respective orthogonal alignment. In the case that a fabric card fails or is removed, a portion of the cooling capacity is lost. However, as the cooling is naturally redundant the line cards will continue to operated and be cooled by the remaining fabric cards. Each fan is internally redundant and the fans on the fabric cards 12 can be individually hot swappable without removing the fabric card 12 itself. The fabric card 12 and line card 14 slots can be provided with blockers to inhibit reverse airflow when a card is removed. Empty line card 14 and fabric card 12 slots can be loaded with filler panels that prevent air bypass.

Each power supply has an internal fan that provides cooling for each power supply. Fans at the power supplies pull air through chassis perforations at the rear, across the chassis management cards 18, and through the power supply units 16. Chassis management card cooling is naturally redundant as multiple power supply units cool a single the chassis management card.

Although in the present example cooling is provided by drawing air from the front to the rear, in another example embodiment cooling could be from the rear to the front.

An example of a high performance switch has been described. The present invention seeks to provide for efficient switch arbitration, for example for a system as described above.

As mentioned in the introduction, the efficiency of a high performance switch for computer buses, for example PCI Express and InfiniBand, is dependent on the chosen arbitration scheme that orders the internal packet transfers from the input ports (transmitters) to the output ports (receivers).

Figure 33:
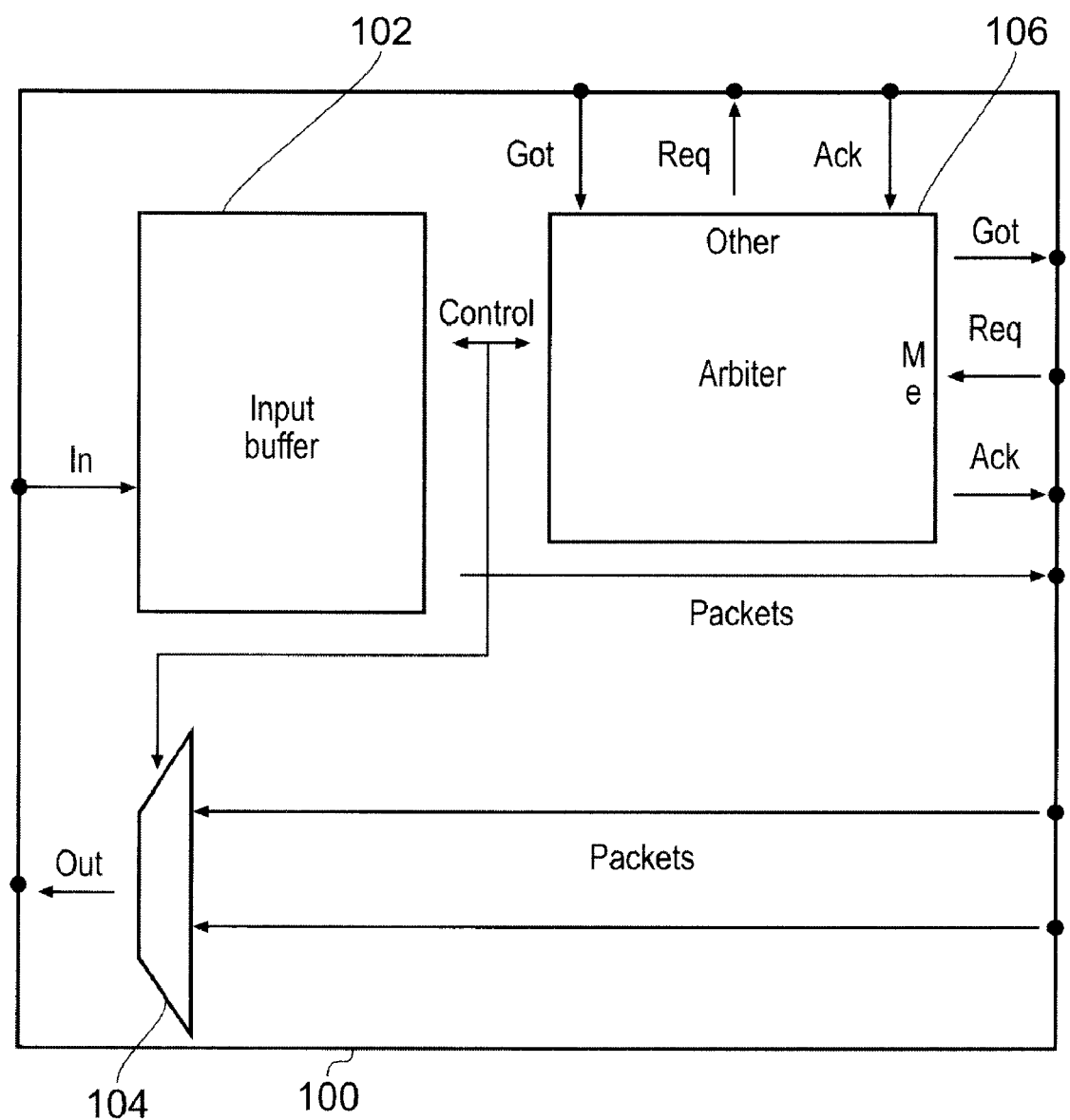
FIG. 33 is a schematic block diagram of a switch port that includes an input buffer and an output multiplexer.

FIG. 33 is a schematic block diagram of a switch port 100 that includes an input buffer 102 on the input side and an output multiplexer 104 on the output side. A switch arbiter 106 forms processing logic for performing switch arbitration. Such a switch port can be used, for example, in a switch chip 35 in a line card as shown, for example in FIG. 14.

Figure 34:
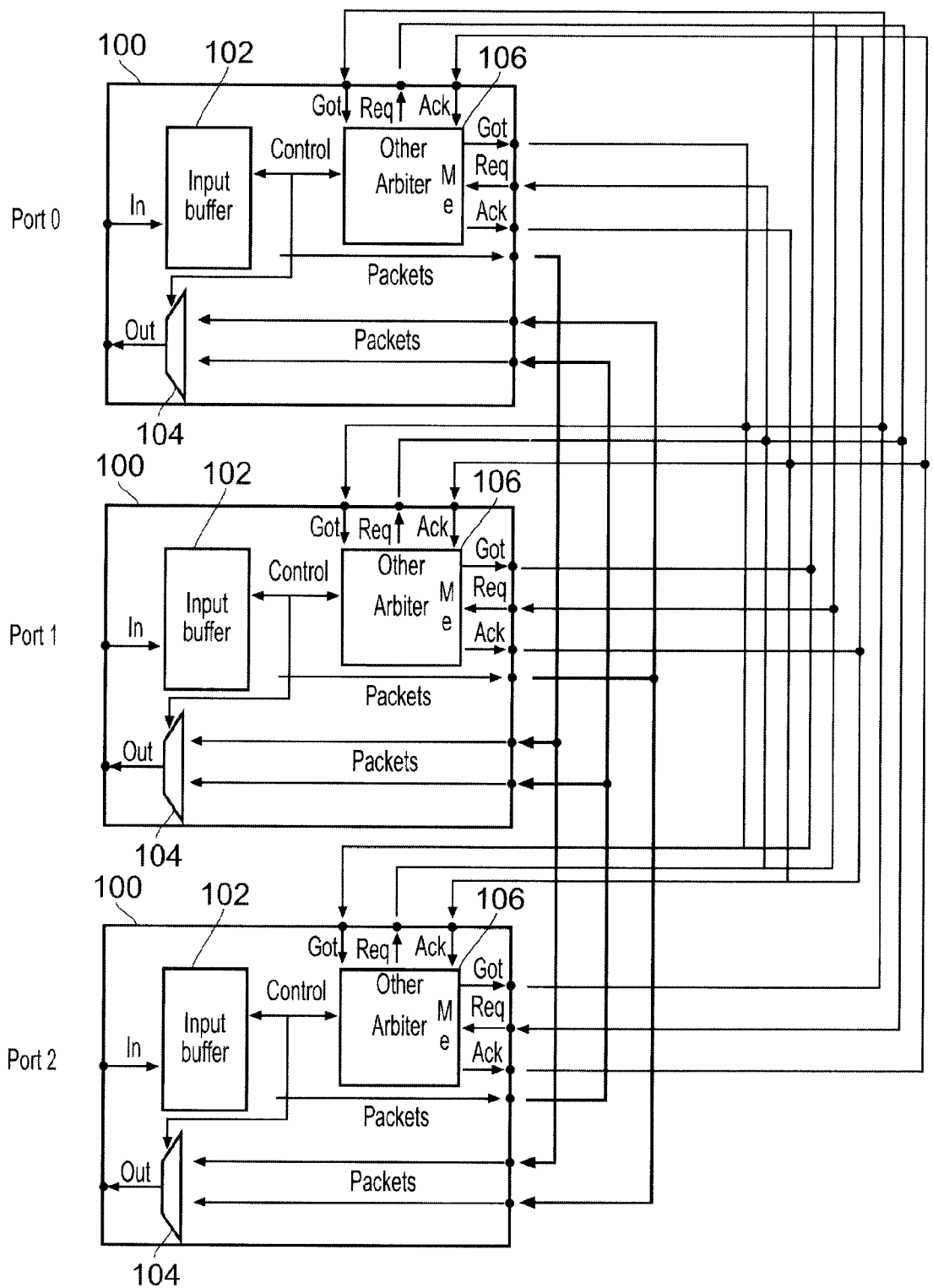
FIG. 34 is a schematic block diagram showing an example of the interconnection of three such ports.
Figure 35:
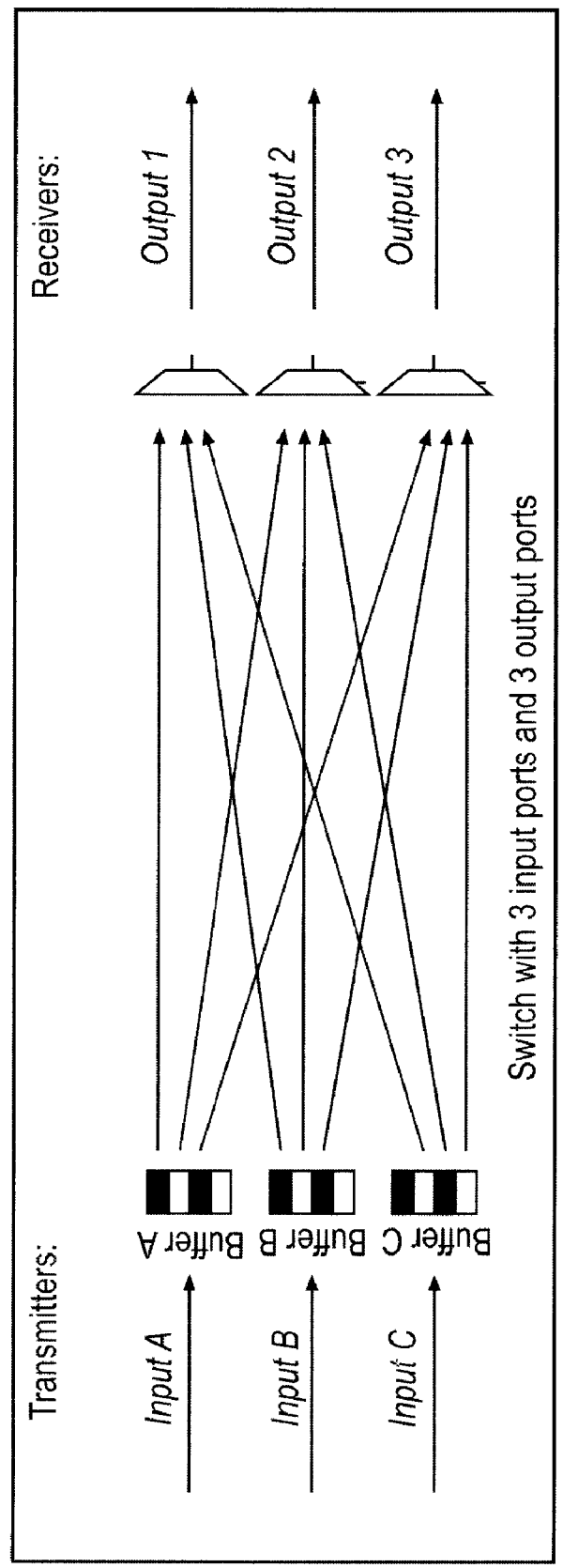
FIG. 35 is a schematic representation of the connection of the input buffers to the output multiplexers of the ports of FIG. 34.

FIG. 34 is a schematic block diagram showing an illustrative example of the interconnection of three such ports Port 1, Port 2 and Port 3 to be used to provide an explanation of examples of aspects of the invention. As shown in FIG. 35, the input buffer 102 of each input port 100 is connected to the output multiplexer 104 of each of the other output ports. Thus, in this example, the input buffer 102 of Port 1 is connected to the output multiplexer 104 of Ports 2 and 3, the input buffer 102 of Port 2 is connected to the output multiplexer 104 of Ports 1 and 3, and the input buffer 102 of Port 3 is connected to the output multiplexer 104 of Ports 1 and 2. The arbiters 106 of each of the three ports 1, 2 and 3 are interconnected to interchange arbitration signals in the form of request (req), acknowledge (ack) and got (got) signals as will be described in the following.

FIG. 35 shows a representation of the interconnection of the three switch ports of FIG. 34 showing the input buffers on the input side on the left and the multiplexers of the output side on the right.

A switch has a number of resources, such as ports, buffers and internal busses. These resources will often depend on each other (e.g., the usage of some resources typically requires the availability of others). At a certain time, a buffer at each input port typically holds packets to several destinations, while packets to a certain destination are held in different input buffers. If an input buffer has a single read port, and this read port is busy feeding data to one output port, another output port might have to wait idle until the read port of the input buffer becomes available. Having an arbitration scheme that orders the packet transfers in a way so that most of the resources of the switch are in use, will make it possible to transfer the highest number of packets at the same time. This will result in a highly efficient switch. On the other hand would a scheme where a great number of the resources are unused for longer periods of time, give low switch efficiency.

Figure 36:
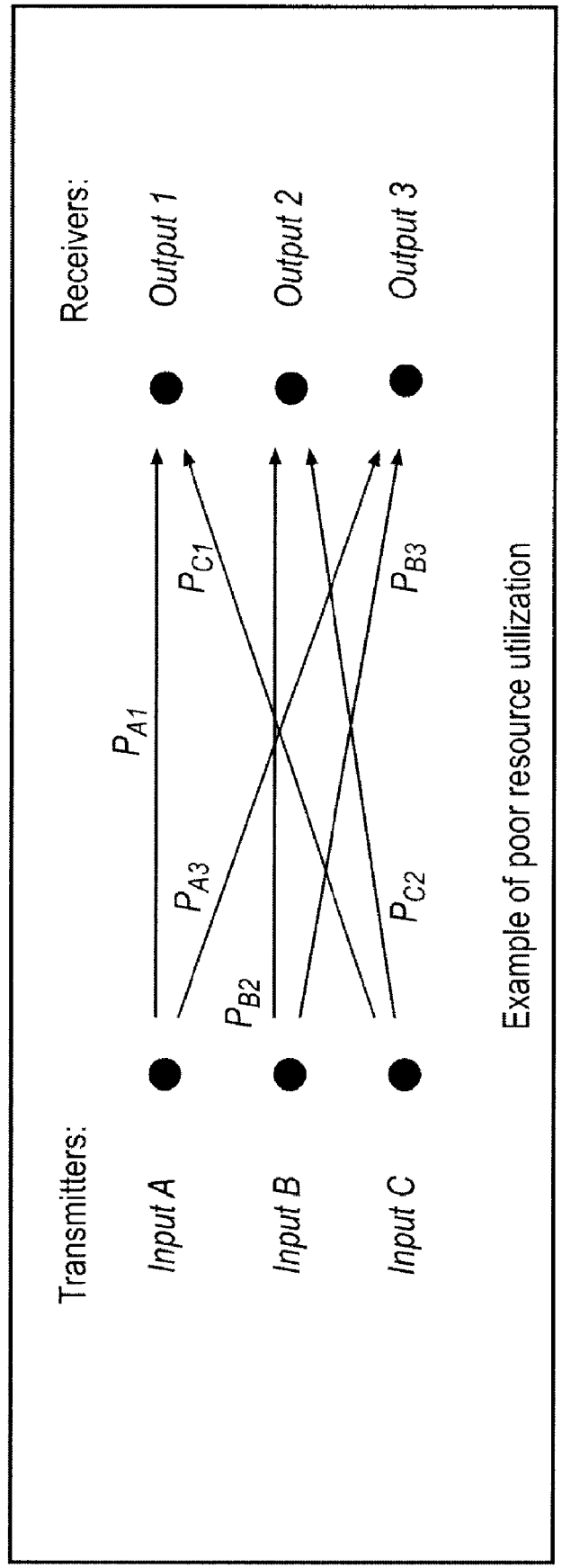
FIG. 36 is a schematic representation showing an example of a conventional local req-ack arbitration scheme providing poor utilization of the resources of a switch.

The following example, shown in FIG. 36, shows an example of a conventional local req-ack arbitration scheme that provides poor utilization of switch resources. In this example there are 3 transmitters with single read ports and 3 receivers with single write ports. At a certain time, each of the transmitters in the example holds 2 packets each, Input A holds a packet to Output 1 (PA1) and to Output 3 (PA3), Input B holds a packet to Output 2 (PB2) and to Output 3 (PB3) and Input C holds a packet to Output 1 (PC1) and to Output 2 (PC2).

If the packets are of about equal size, and the packet from Input A to Output 1 (PA1) is transmitted at the same time as the packet from Input B to Output 2 (PB2), then both resources Input C and Output 3 will be left idle. There will also be contention in the next round when both transmitters Input A and Input B want to transmit a packet to the receiver Output 3 (PA3 and PB3). A much better packet arbiter would transfer a packet to each of the 3 receivers from each of the 3 transmitters in both time intervals, for example first PA1/PB3/PC2 and then PA3/PB2/PC1.

The transmitter and the receiver, between which a certain packet is passed, are here together defined as a transfer pair. The transmitter might at the same time be part of other transfer pairs with other receivers, and the receiver might at the same time be part of transfer pairs with other transmitters. The transmitter and receiver in a transfer pair are each referred to as transfer companions relative to each other. Finding a transfer pair for a packet transfer where neither of the transfer companions are yet chosen to take part in any other packet transfers, is here called to find a match. An arbitration process where the number of matches is increasing is said to be converging towards an optimal solution. In the previous example would Input A make a transfer pair with Output 1 and with Output 3, but not with Output 2. Input A and Output 1 would be transfer companions in one transfer pair, and Input A and Output 3 would be transfer companions in another.

The reason why conventional arbitration schemes often fail to optimally exploit the resources of the switch is that they are based on local limited information. The arbitration signaling between the transfer companions is typically a request (req) signal going one way, and an acknowledge (ack) signal going the other request-acknowledge (req-ack) arbitration. There is no higher order perception that matching Input A with Output 1 at the same time as matching Input B with Output 2, as in the previous example, is not an optimal solution.

More global arbitration schemes have the potential of reducing the amount of time some resources are idle due to contention for others. This will have a great impact on the efficiency, especially for long packets, where the time of transferring the packet, and thus the time to find new matches for the involved transfer companions for the next transfer period, is long. At the same time will a more global arbitration scheme typically be more complex, so traffic with a lot of short packets, where the time between each match finding is comparable to the time of the match finding itself, might actually result in a much lower efficiency if care is not taken.

In addition to efficiency, a switch is often also characterized by fairness, that is the ability to give the different traffic streams a fair part of the resources; and also by guaranteed forward progress, that is the ability to prevent a packet from being stuck in a buffer for a very long period of time. Fairness and guaranteed forward progress often come at the cost of efficiency.

An embodiment of the invention described herein seeks to provide an arbitration scheme that gives a high degree of efficiency both for long and short packets, while fairness and guaranteed forward progress are preserved.

A problem with a conventional local req-ack arbitration scheme is that information about resource usage is only shared between the directly involved parties. To get an improved arbitration, allocation of each resource is provided as a function of the total traffic pattern.

In accordance with an example aspect of an invention described herein, this is achieved by globally distributing information about buffer contents and packet requests. Buffer contents information is distributed through a set of signals, going from transmitters to receivers, called got signals. Packet request information is distributed through a set of signals called req (request) signals. Contrary to the required signals of conventional req-ack scheme, the information in the required signals is here not only sent to one requested transmitter, but all transmitters are informed that a packet transfer is requested from this receiver, and which transmitter the receiver is requesting a packet from. Similarly are the receivers informed about the packets a transmitter holds to various receivers, not only to themselves. Transfer companions in transfer pairs pass information about pending packet transfers between them relative to pending packet transfers from other transmitters and to other receivers by associating a weight with the got and req signals. Selected matches are signaled by passing an ack (acknowledge) signal from transmitters to receivers.

Figure 37:
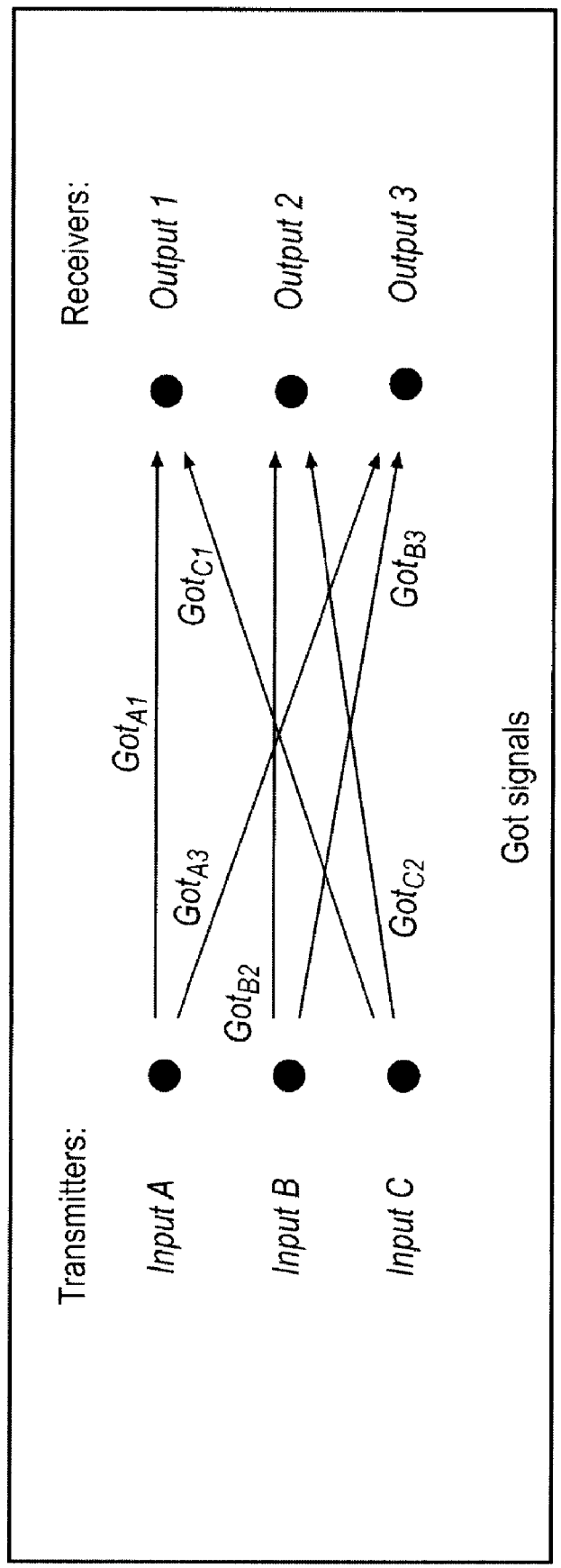
FIG. 37 is a schematic representation of the use of a got signal to provide information about what packets are waiting to be transmitted between transmitters and receivers.

The got signals, shown in FIG. 37, go from transmitters to receivers, and provide information about what packets are waiting to be transmitted between them. There is one set of got signals from each transmitter to each receiver. Information about what packets the transmitter in the pair has to other receivers is at the same time coded into the weight of the got signals, giving the receiver in the pair an indication about the probability of a situation where the transmitter becomes idle if a transaction between this transfer pair is not chosen next. If a transmitter only has packets to one single receiver, the weight of the corresponding got signal from this transmitter to the receiver will be accordingly high.

Figure 38:
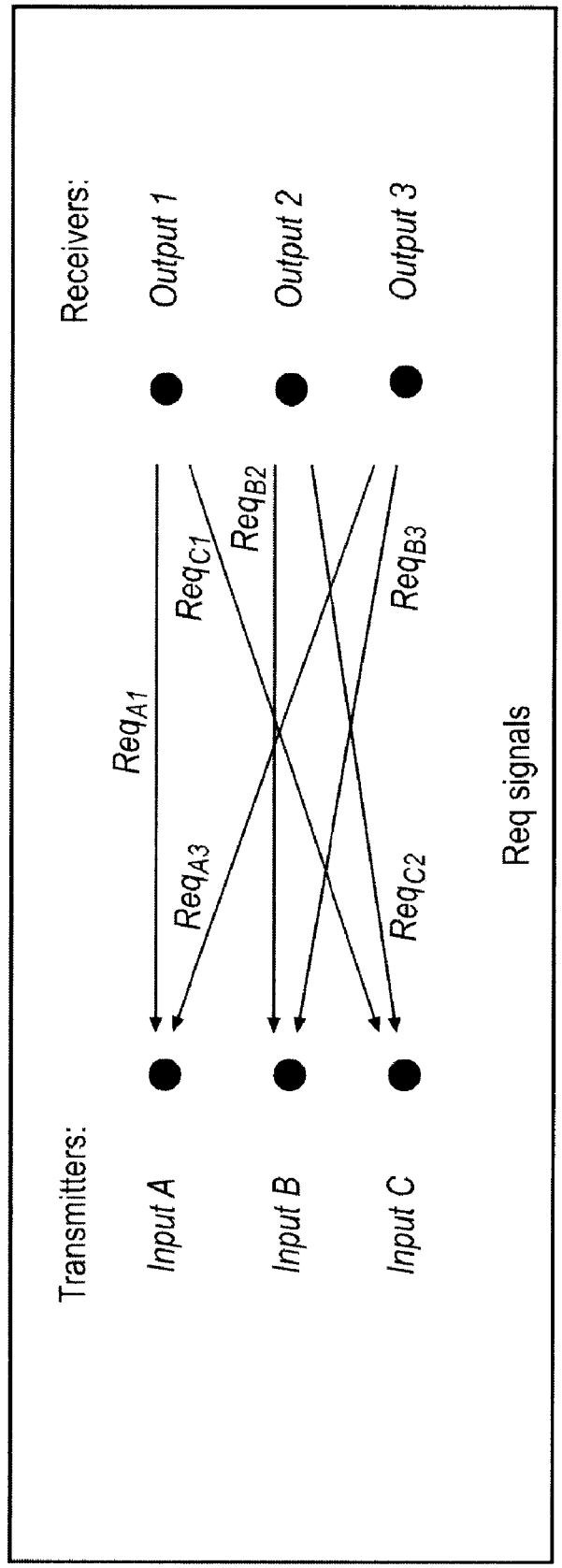
FIG. 38 is a schematic representation of the use of a request signal to provide information about which packet a receiver would like to have transmitted next.

The req signals, shown in FIG. 38, go back from receivers to transmitters, and provide information about which packet the receiver would like to have transmitted next. There is one set of req signals from each receiver to each transmitter. Information about what packets other transmitters have to this receiver is at the same time coded into the weight of the req signals, giving the transmitter in the pair an indication about the probability of a situation where the receiver becomes idle if a transaction between this transfer pair is not chosen next. If only one transmitter has packets to a certain receiver, the weight of the corresponding req signal back to this transmitter from the receiver will be accordingly high.

Figure 39:
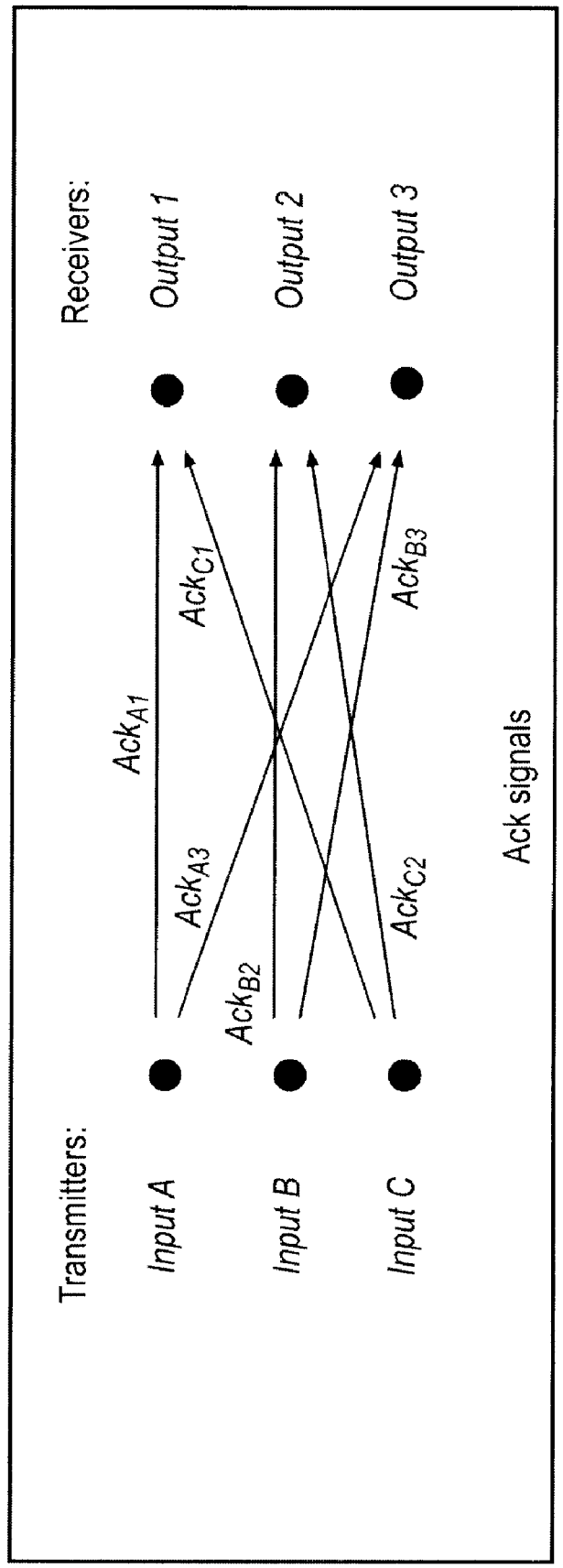
FIG. 39 is a schematic representation of the use of an acknowledge signal to provide information about whether a requested transaction is chosen.

The ack signals, shown in FIG. 39, go from transmitters to receivers, and provide information about whether the requested transaction is chosen. There is one set of ack signals from each transmitter to each receiver. The received ack goes into the weight of the req signals going out from the chosen receiver. Thus all other transmitters that have packets to this receiver are informed that it will be unavailable for some time, which in turn influences the weight of their got signals. The ack signals themselves have no weight.

The req signals in one direction go into the calculation of the weights of the got signals in the transmitters going the opposite direction. This forms a positive feedback loop that increases the probability that transmissions between transmitters with packets to few destinations, and receivers of packets with few transmitters, are chosen first.

Resources with few alternatives for transfer are then assigned first, reducing the chance that they end up unused.

The feedback loop is also the key to achieve a globally more optimal set of transfers for the switch. A transmitter that receives a req signal from a receiver, will increase the weight of the got signal to this receiver. Exchange of got and req signals creates what is here called a binding, and the higher the weights of the got and req signals are, the stronger is the binding said to be. A transmitter getting req signals from several receivers will not increase the weight of the got signals to these receivers, telling them that they might have better chances of finding a match if they request another transmitter. Changing weights of got and req signals in one transfer pair will in turn affect the weights of got and req signals in other transfer pairs, spreading the information about contention at one place throughout the whole switch.

Passing got and req signals between the transfer pairs take several cycles for each round. A switch with many ports, and with a great variety of packet sources and destinations, might have several transfer combinations that are about equally optimal.

Finding the ultimate solution might require many cycles, and might in some cases even be hard to determine. Because of this, the arbitration period, that is the time available to choose which packet will be transferred next, is not fixed but related to the transfer in progress for a transmitter or a receiver. A new transfer is chosen when the previous transfer is close to completion. Packet streams with long packets will then have time to find an optimal match, while packet streams with short packets, where the penalty of choosing less optimal matches is smaller, will not get so optimized.

In an embodiment of the invention, the global distribution of information about buffer contents and packet requests between transmitters and receivers to effect arbitration can be performed during the transmission of packets, whereby arbitration in respect of future transmission of a packet is effected during transmission of a current packet. This provides performance advantages, particularly in the case of the transmission of longer packets, that is packets requiring more than a few cycles.

When the most restricted resources, that is the buffers with packets to the least number of destinations and the output ports that have packets coming to them from the least number of sources, are matched first, the risk of ending up with idle resources is reduced. The least restricted resources have better chances of finding a matching resource later. This provides high efficiency, but leaves a risk of getting a low degree of fairness. There is also a risk that some packets will be waiting for transfer for a very long time, potentially indefinitely.

To ensure fairness, each packet is associated with a time counter, keeping track of how long the packet has been waiting for transmission. The value of this counter is coded into the weight of the got and req signals. Packets are then getting increasingly higher chance of being transmitted with time they have been waiting.

Guaranteed forward progress is provided by including a scoreboard mechanism into the arbitration scheme. When packets have been waiting for transfer for a sufficiently long time, the weight of their req signals will eventually reach the highest value. When this happens, the arbiter goes into a special mode where a concept of generations is introduced. All reqs with highest weights are tagged to be in the same oldest generation. No other reqs are granted as long as there are still pending transfers in the oldest generation. When all these oldest transfers are completed, another generation of reqs with maximum weight is tagged, if any such exists. If there are no more waiting pending transactions with highest weight value, i.e. that have been waiting unproportionally long for transfer, the arbitration goes back to normal mode.

The following example shows how a weight based arbitration scheme can optimize the utilization of the resources of a switch. 3 transmitters have here 2 packets of about equal size each: Input A has a packet to Output 1 (PA1) and to Output 3 (PA3), Input B has a packet to Output 2 (PB2) and to Output 3 (PB3) and Input C has a packet to Output 1 (PC1) and to Output 2 (PC2). There are a number of alternatives for concurrent packet transfers, where optimal utilization is when all transmitters and all receivers are in use at the same time, for example PA1, PB3, and PC2, shown in FIG. 40. This is referred to as good state. An inferior alternative is shown in FIG. 36, where one third of the resources (e.g., Input C and Output 3) is idle. This is referred to as bad state.

In this example, all the transmitters will start by sending information about their buffer contents to the receivers, using the got signals. The traffic pattern here is very symmetric, all receivers will see that there are 2 packets waiting to be transferred to them, and the weight of all the got signals are equal. The receivers have to choose one of the transmitters to request a packet from, and this will be at random at this time, since there is no difference in the weights of the got signals. Throughout this example, Output 1 requests a packet from Input A (Req A1). Some of the request alternatives of Output 2 and Output 3 will then lead to bad state and some will lead to good state. As opposed to conventional req-ack arbitration, the weight based scheme can bring the resource allocation over from bad state to good state.

Figure 41:
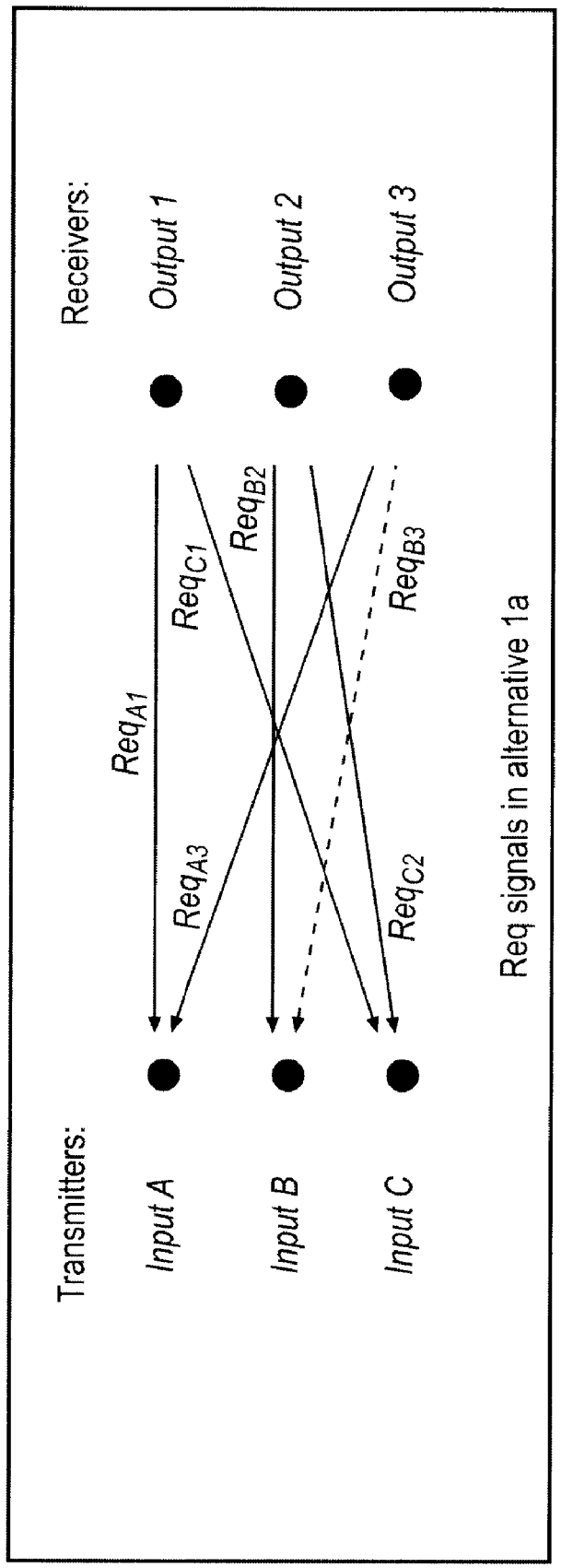
FIG. 41 is a schematic diagram representing a situation where all transmitters get a request.
Figure 42:
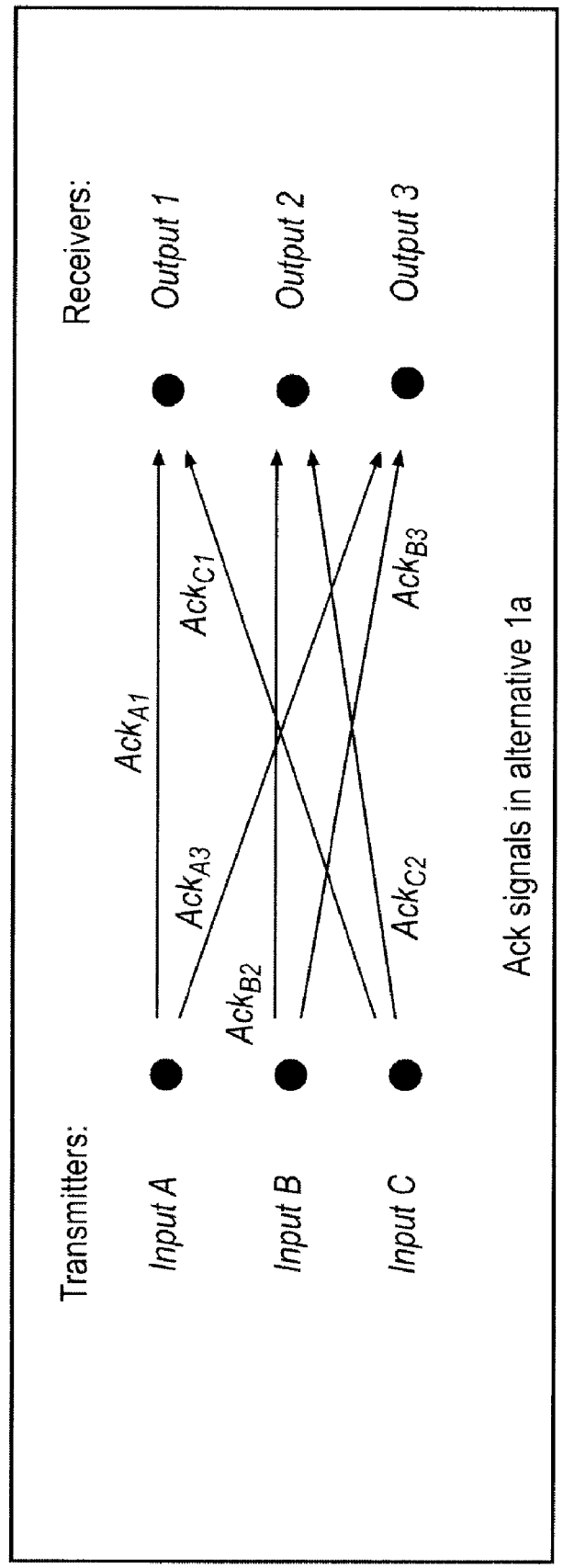
FIG. 42 is a schematic diagram representing a situation where all transmitters can return an acknowledge signal, and all resources are in use.

There are 2 request alternatives for Output 2, the first, that is alternative 1, is when Input C is chosen (Req C2). If now Output 3 chooses to request Input B (Req B3), shown in FIG. 41, then all the transmitters get one request each (alternative 1a). Good state is achieved, the transmitters can return the ack signals, as shown in FIG. 42, and all resources will be in use.

Figure 40:
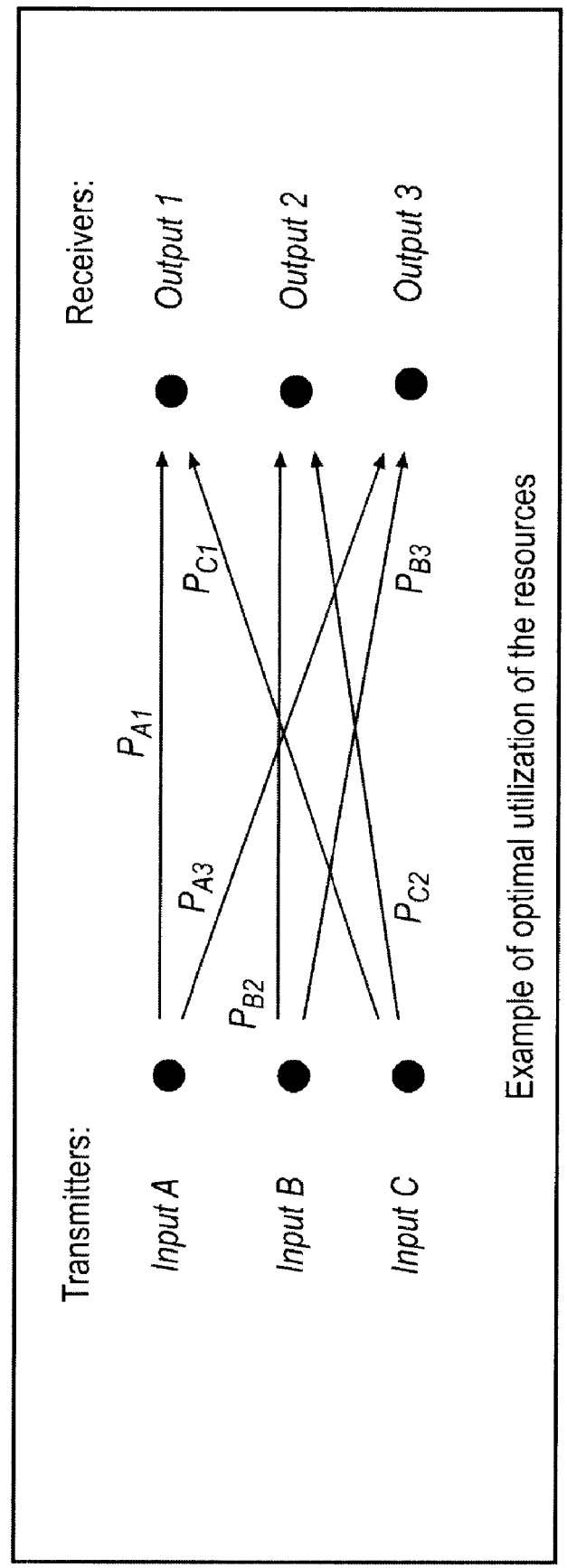
FIG. 40 is a schematic diagram for explaining an example of optimal utilization when all transmitters and all receivers are in use at a time.
Figure 43:
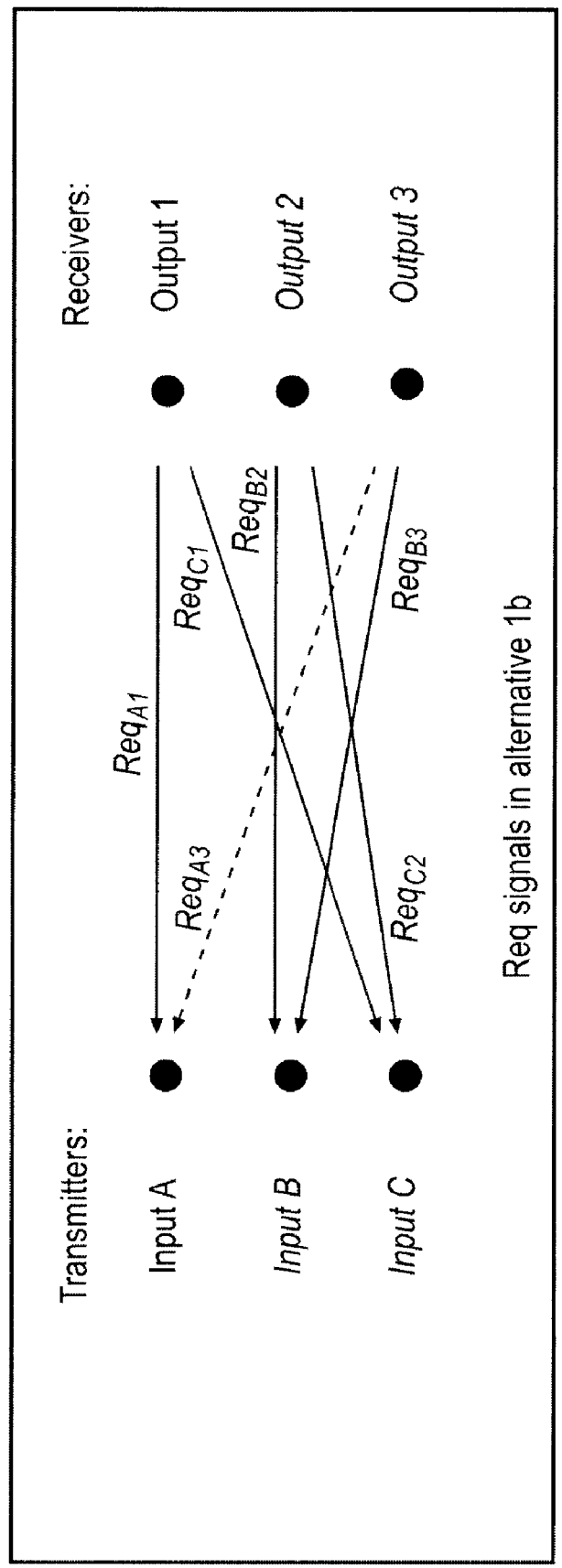
FIG. 43 is a schematic diagram representing a situation where there is contention for a request at a first input and no request at another input.

However, if Output 3 instead chooses to request Input A (Req A3), shown in FIG. 43, then there will be a contention for Input A, while there is no request for Input B. We have here not a good state. Input C has now only one receiver requesting it (Req C2), so the weight of its got signal going back to Output 2 is increased. The got-req feedback loop between Input C and Output 2 tie them more strongly to each other. This will also be reflected in the request signal from Output 2 to Input B (Req B2). Even though Input B is not requested by Output 2, there is still passed information about how the receiver relates to other transmitters in the req signals. In this case, the weight of the Req B2 signal is decreased, due to the strong binding between Output 2 and Input C. At the same time is the binding between Input A and Output 3 not equally strong since Input A has 2 receivers requesting transfer from it, i.e. Output 1 and Output 3. Because the binding between Input A and Output 3 is not strengthened, the weight of the request signal from Output 3 to Input B (Req B3) is not decreased. Input B now has no requests for its 2 packets, but the weight of the request signal coming from Output 3 is still higher than the weight of the request signal coming from Output 2. This will in turn increase the weight of the got signals going from Input B to Output 3. Output 3, seeing a strengthening in the binding to Input B, but not in the binding with the requested Input A, will eventually start requesting transfer from Input B instead. The good state in alternative 1a is again achieved, the transmitters can return the ack signals, as shown in FIG. 40, and all resources will be in use.

Figure 44:
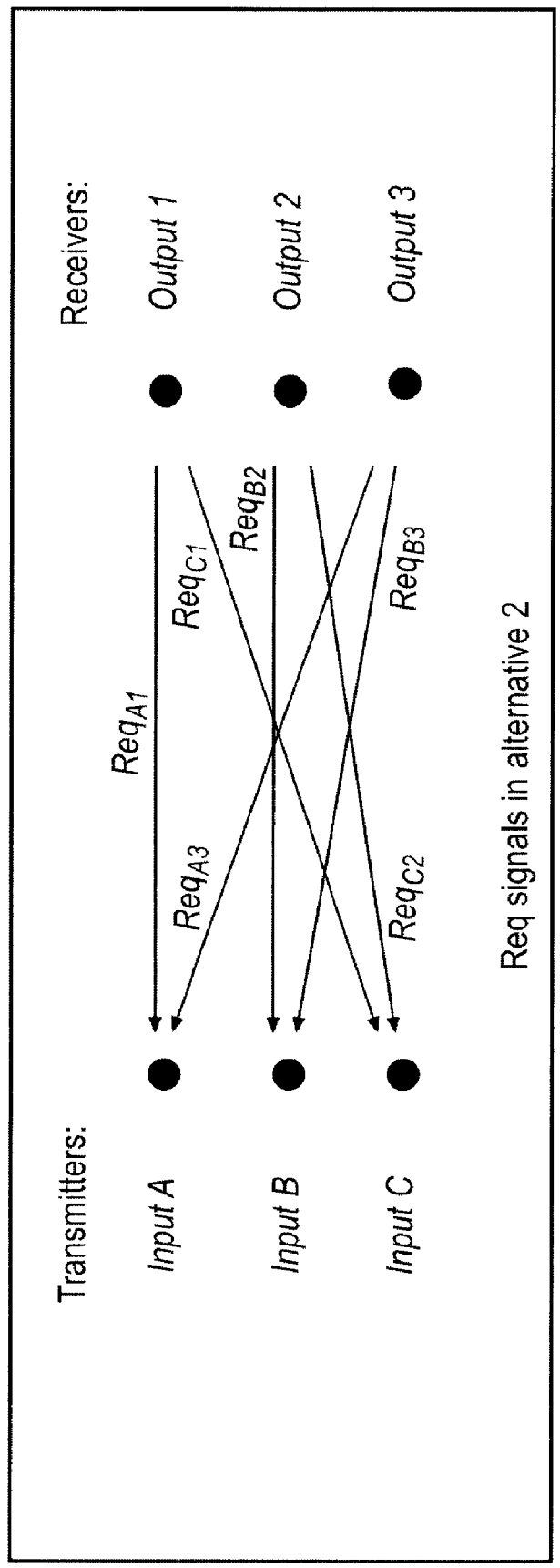
FIG. 44 is a schematic diagram representing one alternative a situation where a request is made to one input.
Figure 45:
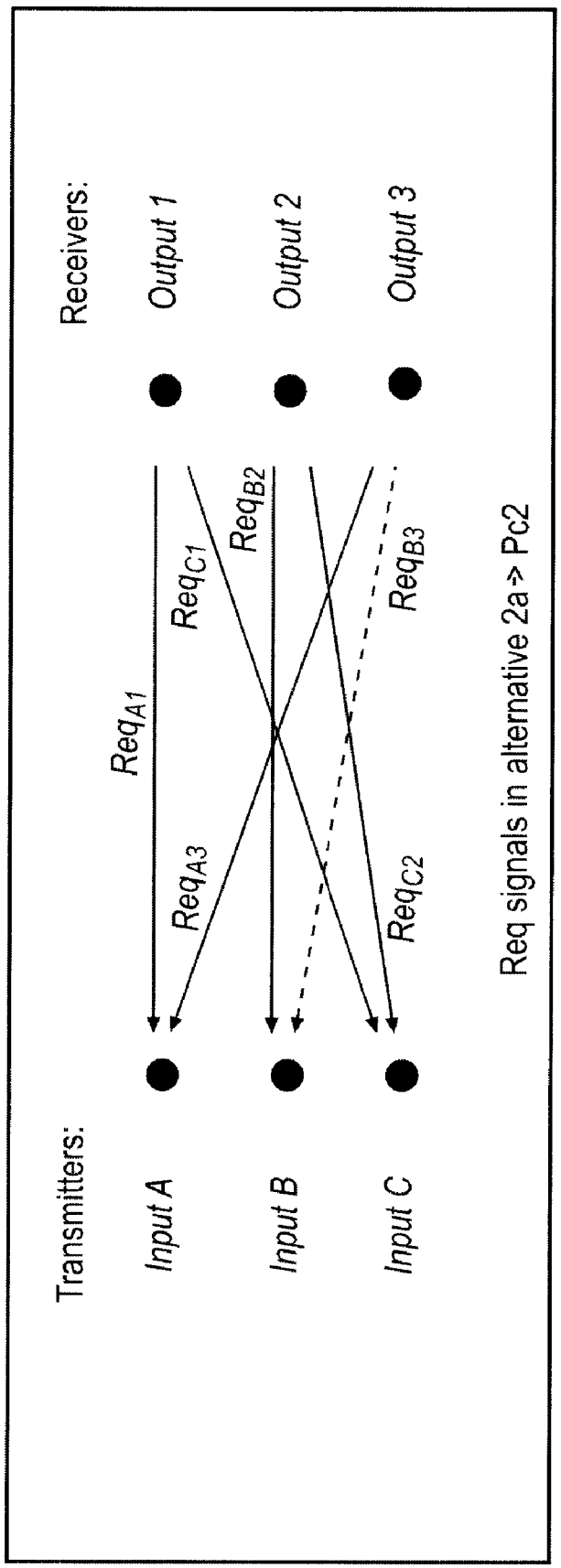
FIG. 45 is a schematic diagram representing an alternative to the situation of FIG. 44.

Alternative 2 is when Output 2 chooses to request Input B (Req B2), shown in FIG. 44. Output 3 can then either choose to request a packet from Input B (alternative 2a) or from Input A (alternative 2b). The request signals in alternative 2a is shown in FIG. 45. Input C has here no receivers requesting transfer from it.

Because Input A only has 1 receiver requesting transfer from it, while Input B has 2, the binding between Input B and Output 2 is stronger than the binding between Input A and Output 2. Because of this, the binding between Input C and Output 2 becomes stronger, and Output 2 will eventually start requesting Input C instead of Input B. The situation has then become like alternative 1b, as shown in FIG. 42, and will later end up in the good state as previously described.

Figure 46:
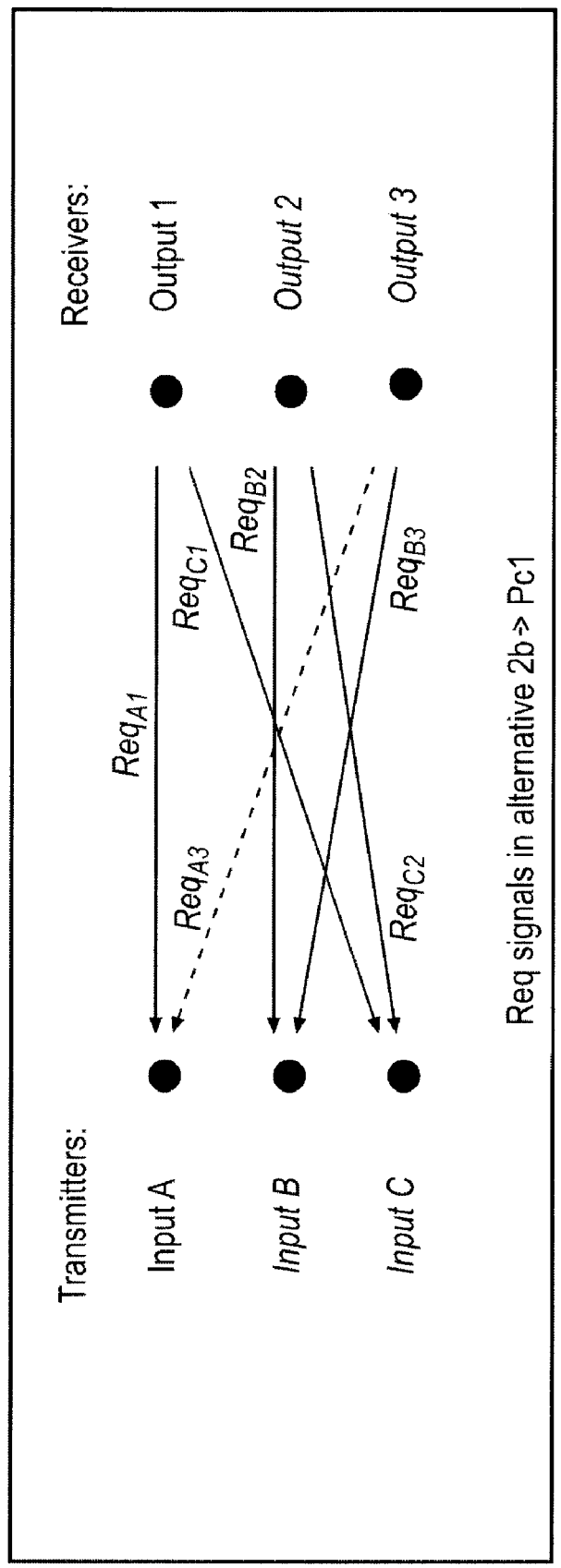
FIG. 46 is a schematic diagram representing a further alternative to the situation of FIG. 44.
Figure 47:
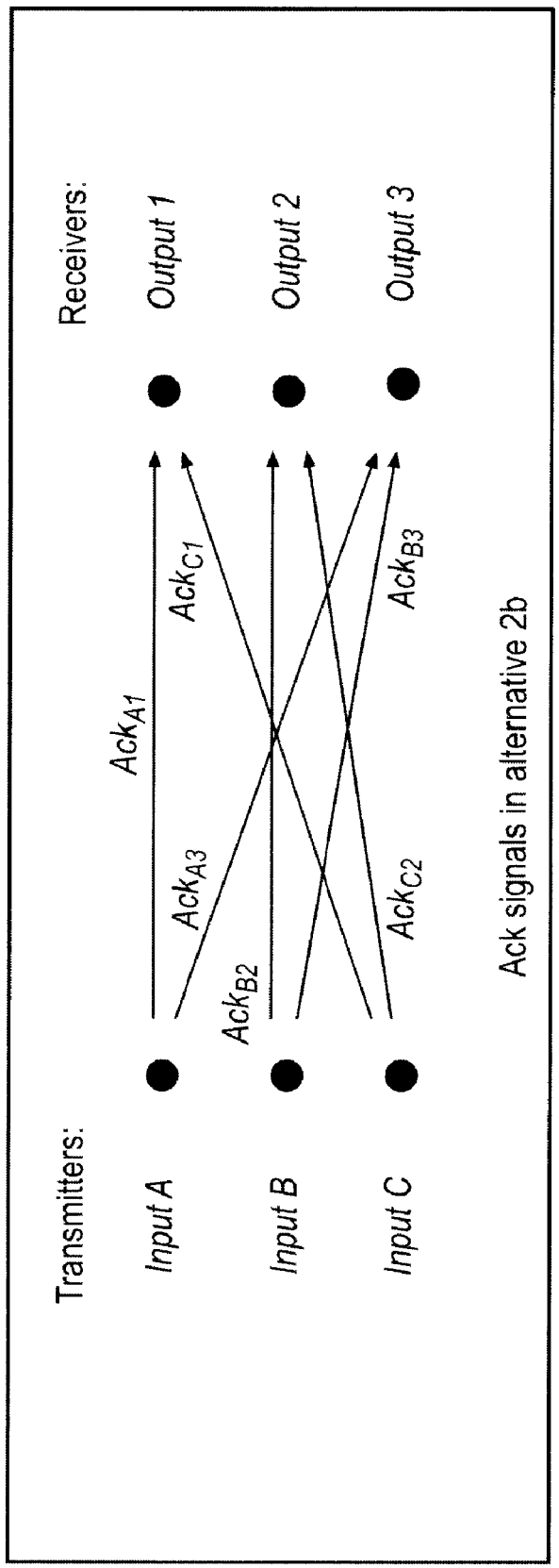
FIG. 47 is a schematic diagram representing a example situation where all transmitters can acknowledge packet transfer.

If Output 3 instead chooses to request a packet from Input A (alternative 2b), the request signals will be as shown in FIG. 46. As in alternative 2a, Input C has here no receivers requesting packets from it, but this time the Input B-Output 2 binding is stronger than the Input A-Output 1 binding. This is because Input A has 2 receivers requesting packets from it while Input B only has 1. Because of this, Output 1 will eventually start requesting a packet from Input C instead. Now all transmitters can acknowledge packet transfer, as shown in FIG. 47. All receivers will also be in use, and good state is again achieved.

Although the embodiments above have been described in considerable detail, numerous variations and modifications will become apparent to those skilled in the art once the above disclosure is fully appreciated.

What is claimed is:

1. A method of providing switch arbitration for the passing of packets between transmitters and receivers in a switch having a plurality of transmitters and receivers, the method comprising:

globally distributing information about buffer contents and packet requests between transmitters and receivers, wherein buffer contents information is distributed through a set of first signals from a transmitter to all receivers, the first signals informing all receivers about the packets a transmitter holds to respective receivers, wherein packet request information is distributed through a set of second signals sent from a receiver requesting a packet transfer to all transmitters, the second signals informing the transmitters that a packet transfer is requested from this receiver, and from which transmitter the receiver is requesting a packet, wherein a transmitter having a packet to be transferred to a receiver and the receiver to receive that packet form a transfer pair, and wherein the transfer pairs pass information about pending packet transfers between them relative to pending packet transfers from other transmitters and to other receivers by associating a weight with the first and second signals.

2. The method of claim 1, wherein the transmitter and receiver that form the transfer pair form transfer companions with respect to each other.

3. The method of claim 2, wherein selected matches are signaled by passing a third signal from transmitters to receivers and providing information about whether a requested transaction is chosen.

4. The method of claim 2, wherein information about what packets the transmitter in a transfer pair has to other receivers is at the same time coded into the weight of the first signals to give the receiver in the transfer pair an indication of the probability of the transmitter becoming idle if a transaction between this transfer pair is not chosen next.

5. The method of claim 4, wherein the second signals go back from receivers to transmitters and provide information about which packet the receiver would like to have transmitted next.

6. The method of claim 5, wherein a transmitter that receives a second signal from a receiver increases the weight of the first signal to this receiver, whereby an exchange of first and second signals creates a binding that is stronger the higher the weights of the first and second signals.

7. The method of claim 5, wherein a transmitter that receives second signals from several receivers does not increase the weight of the first signals to these receivers, whereby the several receivers are responsive there to by making a request to another transmitter to increase the chance of finding a match.

8. The method of claim 1, wherein changing weights of the first and second signals in one transfer pair will in turn affect the weights of first and second signals in other transfer pairs, spreading information about contention at one place throughout the whole switch.

9. The method of claim 1, wherein a packet is associated with a time counter that tracks how long the packet has been waiting for transmission.

10. The method of claim 9, wherein the value of the counter for a packet is coded into a weight of the first and second signals, whereby packets have an increasing chance of being transmitted according to the time they have been waiting.

11. The method of claim 10, wherein, when packets have been waiting for transfer for a predetermined time, the weight of their second signal will reach a threshold value at which time an arbiter provides a mode of operation whereby all requests with a weight at or above the threshold are processed before any other requests.

12. The method of claim 1, wherein the global distribution of information about buffer contents and packet requests between transmitters and receivers to effect arbitration is performed during the transmission of packets, whereby arbitration in respect of future transmission of a packet is effected during transmission of a current packet.

13. A switch having a plurality of transmitters and receivers, wherein:

the transmitters and receivers are configured to provide switch arbitration for the passing of packets between the transmitters and receivers;

a transmitter having buffer contents to transmit is operable to distribute information about the buffer contents globally to all receivers; and a receiver requesting a packet transfer is operable to distribute packet request information globally to all transmitters, wherein buffer contents information is distributed through a set of first signals from a transmitter to all receivers, the first signals informing all receivers about the packets a transmitter holds to respective receivers, wherein packet request information is distributed through a set of second signals sent from a receiver requesting a packet transfer to all transmitters, the second signals informing the transmitters that a packet transfer is requested from this receiver, and from which transmitter the receiver is requesting a packet, wherein a transmitter having a packet to be transferred to a receiver and the receiver to receive that packet form a transfer pair, and wherein the transfer pairs pass information about pending packet transfers between them relative to pending packet transfers from other transmitters and to other receivers by associating a weight with the first and second signals.

14. A non-transitory computer readable medium comprising program code operable to control one or more processors to control transmitters and receivers of a switch such that:

the transmitters and receivers are configured to provide switch arbitration for the passing of packets between the transmitters and receivers;

a transmitter having buffer contents to transmit is operable to distribute information about the buffer contents globally to all receivers; and a receiver requesting a packet transfer is operable to distribute packet request information globally to all transmitters, wherein buffer contents information is distributed through a set of first signals from a transmitter to all receivers, the first signals informing all receivers about the packets a transmitter holds to respective receivers, wherein packet request information is distributed through a set of second signals sent from a receiver requesting a packet transfer to all transmitters, the second signals informing the transmitters that a packet transfer is requested from this receiver, and from which transmitter the receiver is requesting a packet, wherein a transmitter having a packet to be transferred to a receiver and the receiver to receive that packet form a transfer pair, and wherein the transfer pairs pass information about pending packet transfers between them relative to pending packet transfers from other transmitters and to other receivers by associating a weight with the first and second signals.

* * * * *